(12) United States Patent
LeTourneau

(10) Patent No.: US 10,325,031 B2
(45) Date of Patent: *Jun. 18, 2019

(54) METHOD AND/OR SYSTEM FOR MANIPULATING TREE EXPRESSIONS

(71) Applicant: Robert T. and Virginia T. Jenkins as Trustees of the Jenkins Family Trust Dated Feb. 8, 2002, Sacramento, CA (US)

(72) Inventor: Jack J. LeTourneau, Ventura, CA (US)

(73) Assignee: Robert T. and Virginia T. Jenkins as Trustees of the Jenkins Family Trust dated Feb. 8, 2002, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/250,118

(22) Filed: Aug. 29, 2016

(65) Prior Publication Data

US 2017/0053006 A1 Feb. 23, 2017

Related U.S. Application Data

(63) Continuation of application No. 14/635,836, filed on Mar. 2, 2015, now Pat. No. 9,430,512, which is a continuation of application No. 14/086,837, filed on Nov. 21, 2013, now Pat. No. 9,043,347, which is a continuation of application No. 12/578,411, filed on Oct. 13, 2009, now Pat. No. 8,626,777, which is a continuation of application No. 11/006,841, filed on Dec. 7, 2004, now Pat. No. 7,627,591.

(60) Provisional application No. 60/623,280, filed on Oct. 29, 2004.

(51) Int. Cl.
*G06F 17/30* (2006.01)
*G06F 7/00* (2006.01)

(52) U.S. Cl.
CPC .. *G06F 17/30569* (2013.01); *G06F 17/30292* (2013.01); *G06F 17/30327* (2013.01); *G06F 17/30451* (2013.01); *G06F 17/30589* (2013.01); *G06F 17/30961* (2013.01); *Y10S 707/99942* (2013.01)

(58) Field of Classification Search
CPC ......... G06F 17/30327; G06F 17/30292; G06F 17/30961; G06F 17/30589; G06F 17/30451; G06F 17/30569; Y10S 707/99942
USPC ........................................................ 707/756
See application file for complete search history.

(56) References Cited

U.S. PATENT DOCUMENTS

| | | |
|---|---|---|
| 3,201,701 A | 8/1965 | Maitra |
| 3,704,345 A | 11/1972 | Coker |
| 4,001,951 A | 1/1977 | Fasse |
| 4,134,218 A | 1/1979 | Adams et al. |
| 4,156,910 A | 5/1979 | Barton et al. |
| 4,286,330 A | 8/1981 | Isaacson |
| 4,439,162 A | 3/1984 | Blaine |

(Continued)

OTHER PUBLICATIONS

"Core Technology Benchmarks a White Paper", Jul. 2002, downloaded from the internet Mar. 2, 2004.

(Continued)

*Primary Examiner* — Kuen S Lu
(74) *Attorney, Agent, or Firm* — Berkeley Law & Technology Group, LLP

(57) ABSTRACT

Embodiments of methods and/or systems of manipulating tree expressions are disclosed.

42 Claims, 17 Drawing Sheets

(56) References Cited

U.S. PATENT DOCUMENTS

| | | |
|---|---|---|
| 4,677,550 A | 6/1987 | Ferguson |
| 4,737,109 A | 4/1988 | Abramson |
| 4,745,561 A | 5/1988 | Hirosawa et al. |
| 4,751,684 A | 6/1988 | Holt |
| 4,831,525 A | 5/1989 | Saito et al. |
| 4,867,686 A | 9/1989 | Goldstein |
| 4,931,928 A | 6/1990 | Greenfeld |
| 4,949,388 A | 8/1990 | Bhaskaran |
| 4,989,132 A | 1/1991 | Mellender et al. |
| 4,991,087 A | 2/1991 | Burkowski et al. |
| 5,021,943 A | 6/1991 | Grimes |
| 5,021,992 A | 6/1991 | Kondo |
| 5,050,071 A | 9/1991 | Harris et al. |
| 5,191,522 A | 3/1993 | Bosco et al. |
| 5,235,701 A | 8/1993 | Ohler et al. |
| 5,265,245 A | 11/1993 | Nordstrom et al. |
| 5,295,261 A | 3/1994 | Simonetti |
| 5,325,531 A | 6/1994 | McKeeman |
| 5,335,320 A | 8/1994 | Iwata |
| 5,335,345 A | 8/1994 | Frieder et al. |
| 5,355,496 A | 10/1994 | Fant et al. |
| 5,463,777 A | 10/1995 | Bialkowski et al. |
| 5,493,504 A | 2/1996 | Minato |
| 5,497,500 A | 3/1996 | Rogers et al. |
| 5,509,088 A | 4/1996 | Robson |
| 5,519,627 A | 5/1996 | Mahmood et al. |
| 5,522,068 A | 5/1996 | Berkowitz |
| 5,577,253 A | 11/1996 | Blickstein |
| 5,598,350 A | 1/1997 | Kawanishi et al. |
| 5,606,669 A | 2/1997 | Bertin et al. |
| 5,636,155 A | 6/1997 | Kabuo |
| 5,687,362 A | 11/1997 | Bhargava et al. |
| 5,706,406 A | 1/1998 | Pollock |
| 5,724,512 A | 3/1998 | Winterbottom |
| 5,724,576 A | 3/1998 | Letourneau |
| 5,748,975 A | 5/1998 | Van De Vanter |
| 5,758,152 A | 5/1998 | LeTourneau |
| 5,778,354 A | 7/1998 | Leslie |
| 5,778,371 A | 7/1998 | Fujihara |
| 5,781,906 A | 7/1998 | Aggarwal et al. |
| 5,787,415 A | 7/1998 | Jacobson et al. |
| 5,787,432 A | 7/1998 | Letourneau |
| 5,796,356 A | 8/1998 | Okada et al. |
| 5,802,370 A | 9/1998 | Sitbon et al. |
| 5,822,593 A | 10/1998 | Lamping et al. |
| 5,826,262 A | 10/1998 | Bui |
| 5,848,159 A | 12/1998 | Collins et al. |
| 5,905,138 A | 5/1999 | Van Broekhoven |
| 5,930,805 A | 7/1999 | Marquis |
| 5,937,181 A | 8/1999 | Godefroid |
| 5,970,490 A | 10/1999 | Morgenstern |
| 5,978,790 A | 11/1999 | Buneman et al. |
| 5,987,449 A | 11/1999 | Suciu |
| 5,999,926 A | 12/1999 | Suciu |
| 6,002,879 A | 12/1999 | Radigan et al. |
| 6,003,033 A | 12/1999 | Amano et al. |
| 6,022,879 A | 2/2000 | Crow et al. |
| 6,028,987 A | 2/2000 | Hirairi |
| 6,055,537 A | 4/2000 | LeTourneau |
| 6,076,087 A | 6/2000 | Suciu |
| 6,088,691 A | 7/2000 | Bhargava et al. |
| 6,141,655 A | 10/2000 | Johnson et al. |
| 6,199,103 B1 | 3/2001 | Sakuguchi et al. |
| 6,236,410 B1 | 5/2001 | Politis et al. |
| 6,243,859 B1 | 6/2001 | Chen-Kuang |
| 6,279,007 B1 | 8/2001 | Uppala |
| 6,289,354 B1 | 9/2001 | Aggarwal et al. |
| 6,292,938 B1 | 9/2001 | Sarkar et al. |
| 6,314,559 B1 | 11/2001 | Sollich |
| 6,336,812 B1 | 1/2002 | Cooper et al. |
| 6,341,372 B1 | 1/2002 | Datig |
| 6,442,584 B1 | 8/2002 | Kolli et al. |
| 6,446,256 B1 | 9/2002 | Hyman et al. |
| 6,466,240 B1 | 10/2002 | Maslov |
| 6,505,205 B1 | 1/2003 | Kothuri et al. |
| 6,542,899 B1 | 4/2003 | Saulpaugh et al. |
| 6,550,024 B1 | 4/2003 | Pagurek et al. |
| 6,556,983 B1 | 4/2003 | Altschuler et al. |
| 6,598,052 B1 | 7/2003 | Saulpaugh et al. |
| 6,606,632 B1 | 8/2003 | Saulpaugh et al. |
| 6,606,741 B2 | 8/2003 | Kojima et al. |
| 6,609,130 B1 | 8/2003 | Saulpaugh et al. |
| 6,610,106 B1 | 8/2003 | Jenks |
| 6,611,844 B1 | 8/2003 | Saulpaugh et al. |
| 6,640,218 B1 | 10/2003 | Golding |
| 6,658,649 B1 | 12/2003 | Bates et al. |
| 6,691,301 B2 | 2/2004 | Bowen |
| 6,714,939 B2 | 3/2004 | Saldanha et al. |
| 6,728,953 B1 | 4/2004 | Walster |
| 6,745,384 B1 | 6/2004 | Biggerstaff |
| 6,748,378 B1 | 6/2004 | Lavender et al. |
| 6,763,515 B1 | 7/2004 | Vazquez et al. |
| 6,785,673 B1 | 8/2004 | Fernandez et al. |
| 6,817,865 B2 | 11/2004 | Charbonneau |
| 6,829,695 B1 | 12/2004 | Ross |
| 6,847,979 B2 | 1/2005 | Allemang et al. |
| 6,854,976 B1 | 2/2005 | Suhr |
| 6,874,005 B2 | 3/2005 | Fortenberry et al. |
| 6,880,148 B1 | 4/2005 | Raph |
| 6,965,990 B2 | 11/2005 | Barsness et al. |
| 6,968,330 B2 | 11/2005 | Edwards et al. |
| 6,978,271 B1 | 12/2005 | Hoffman |
| 7,043,555 B1 | 5/2006 | McCain et al. |
| 7,051,033 B2 | 5/2006 | Agarwal et al. |
| 7,072,904 B2 | 7/2006 | Najork et al. |
| 7,103,838 B1 | 9/2006 | Krishnamurthy et al. |
| 7,107,265 B1 | 9/2006 | Calvignac et al. |
| 7,117,196 B2 | 10/2006 | Gaur et al. |
| 7,117,479 B2 | 10/2006 | Van De Vanter |
| 7,127,704 B2 | 10/2006 | Van De Vanter et al. |
| 7,134,075 B2 | 11/2006 | Hind et al. |
| 7,140,006 B2 | 11/2006 | Harrison et al. |
| 7,162,485 B2 | 1/2007 | Gottlob et al. |
| 7,191,182 B2 | 3/2007 | Anonsen et al. |
| 7,203,680 B2 | 4/2007 | Parida |
| 7,203,774 B1 | 4/2007 | Zhou et al. |
| 7,287,026 B2 | 10/2007 | Oommen |
| 7,313,563 B2 | 12/2007 | Bordawekar et al. |
| 7,318,215 B1 | 1/2008 | Krishnan et al. |
| 7,337,163 B1 | 2/2008 | Srinivasan |
| 7,356,802 B2 | 4/2008 | de Sutter et al. |
| 7,360,202 B1 | 4/2008 | Seshadri et al. |
| 7,409,673 B2 | 8/2008 | Kuo et al. |
| 7,419,376 B2 | 9/2008 | Sarvazyan et al. |
| 7,437,666 B2 | 10/2008 | Ramarao |
| 7,475,070 B2 | 1/2009 | Fan et al. |
| 7,496,892 B2 | 2/2009 | Nuss |
| 7,512,932 B2 | 3/2009 | Davidov et al. |
| 7,536,675 B2 | 5/2009 | Gallagher |
| 7,536,676 B2 | 5/2009 | Baker |
| 7,544,062 B1 | 6/2009 | Hauschild et al. |
| 7,561,927 B2 | 7/2009 | Oyama et al. |
| 7,571,156 B1 | 8/2009 | Gupta et al. |
| 7,571,169 B2 | 8/2009 | Jones et al. |
| 7,574,692 B2 | 8/2009 | Herscu |
| 7,575,434 B2 | 8/2009 | Palakodeti |
| 7,620,632 B2 | 11/2009 | Andrews |
| 7,627,591 B2 | 12/2009 | LeTourneau |
| 7,630,995 B2 | 12/2009 | LeTourneau |
| 7,636,727 B2 | 12/2009 | Schiffmann et al. |
| 7,650,592 B2 | 1/2010 | Eckels et al. |
| 7,669,183 B2 | 2/2010 | Bowman et al. |
| 7,681,177 B2 | 3/2010 | LeTourneau |
| 7,761,847 B2 | 7/2010 | Kornerup et al. |
| 7,761,858 B2 | 7/2010 | Chang et al. |
| 7,765,183 B2 | 7/2010 | Williams, Jr. |
| 7,779,396 B2 | 8/2010 | Meijer et al. |
| 7,801,923 B2 | 9/2010 | LeTourneau |
| 7,861,304 B1 | 12/2010 | Nachenberg |
| 7,882,147 B2 | 2/2011 | LeTourneau |
| 7,890,928 B2 | 2/2011 | Patrudu |
| 7,899,821 B1 | 3/2011 | Schiffmann |
| 8,020,145 B2 | 9/2011 | Fant |
| 8,032,860 B2 | 10/2011 | Piehler et al. |

(56) References Cited

U.S. PATENT DOCUMENTS

| | | | |
|---|---|---|---|
| 8,037,102 B2 | 10/2011 | LeTourneau | |
| 8,060,868 B2 | 11/2011 | Meijer et al. | |
| 8,112,740 B2 | 2/2012 | Meijer et al. | |
| 8,151,276 B2 | 4/2012 | Grechanik | |
| 8,181,155 B2 | 5/2012 | Pinto et al. | |
| 8,230,526 B2 | 7/2012 | Holland et al. | |
| 8,250,526 B2 | 8/2012 | Anderson et al. | |
| 8,316,059 B1 | 11/2012 | Schiffmann | |
| 8,356,040 B2 | 1/2013 | LeTourneau | |
| 8,365,137 B2 | 1/2013 | Fant | |
| 8,438,534 B2 | 5/2013 | Thomson | |
| 8,443,339 B2 | 5/2013 | LeTourneau | |
| 8,484,236 B1 | 7/2013 | Andrews | |
| 8,626,777 B2 | 1/2014 | LeTourneau | |
| 8,650,201 B2 | 2/2014 | LeTourneau | |
| 8,683,431 B2 | 3/2014 | Thomson et al. | |
| 8,762,942 B2 | 6/2014 | Langworthy et al. | |
| 8,869,106 B2 | 10/2014 | Jazdzewski | |
| 8,990,769 B2 | 3/2015 | LeTourneau | |
| 9,002,862 B2 | 4/2015 | Schiffmann | |
| 9,020,961 B2 | 4/2015 | LeTourneau | |
| 9,043,347 B2 | 5/2015 | LeTourneau | |
| 9,077,515 B2 | 7/2015 | LeTourneau | |
| 9,330,128 B2 | 5/2016 | Schiffmann | |
| 9,411,841 B2 | 8/2016 | Schiffmann | |
| 9,425,951 B2 | 8/2016 | LeTourneau | |
| 9,430,512 B2 | 8/2016 | LeTourneau | |
| 2001/0003211 A1 | 6/2001 | Bera | |
| 2001/0037496 A1* | 11/2001 | Simonyi | G06F 8/30 717/146 |
| 2002/0062259 A1 | 2/2002 | Katz et al. | |
| 2002/0040292 A1 | 4/2002 | Marcu | |
| 2002/0059281 A1 | 5/2002 | Watanabe et al. | |
| 2002/0107860 A1 | 8/2002 | Gobeille et al. | |
| 2002/0129129 A1 | 9/2002 | Bloch et al. | |
| 2002/0130796 A1 | 9/2002 | Tsuchido et al. | |
| 2002/0130907 A1 | 9/2002 | Chi | |
| 2002/0133347 A1 | 9/2002 | Schoneburg | |
| 2002/0133497 A1 | 9/2002 | Draper et al. | |
| 2002/0149604 A1 | 10/2002 | Wilkinson | |
| 2002/0169563 A1 | 11/2002 | de Carvalho Ferreira | |
| 2003/0041088 A1 | 2/2003 | Wilson et al. | |
| 2003/0065659 A1 | 4/2003 | Agarwal et al. | |
| 2003/0074436 A1 | 4/2003 | Gieseke | |
| 2003/0115559 A1 | 6/2003 | Sawada | |
| 2003/0130977 A1 | 7/2003 | Oommen | |
| 2003/0167445 A1 | 9/2003 | Su et al. | |
| 2003/0195885 A1 | 10/2003 | Emmick et al. | |
| 2003/0195890 A1* | 10/2003 | Oommen | G06F 17/30961 |
| 2003/0236794 A1 | 12/2003 | Hostetter et al. | |
| 2004/0010752 A1 | 1/2004 | Chan et al. | |
| 2004/0019599 A1* | 1/2004 | Trappen | G06F 17/30595 |
| 2004/0024724 A1 | 2/2004 | Rubin | |
| 2004/0024790 A1 | 2/2004 | Everett | |
| 2004/0044659 A1 | 3/2004 | Judd et al. | |
| 2004/0054692 A1 | 3/2004 | Seyrat et al. | |
| 2004/0060006 A1 | 3/2004 | Lindblad | |
| 2004/0060007 A1 | 3/2004 | Gottlob et al. | |
| 2004/0068498 A1 | 4/2004 | Patchet et al. | |
| 2004/0075677 A1* | 4/2004 | Loyall | G10L 13/00 715/706 |
| 2004/0103105 A1 | 5/2004 | Lindblad et al. | |
| 2004/0122844 A1 | 6/2004 | Malloy | |
| 2004/0125124 A1* | 7/2004 | Kim | G06F 17/30799 715/716 |
| 2004/0160464 A1* | 8/2004 | Reyna | G06F 8/34 715/854 |
| 2004/0205047 A1 | 10/2004 | Carpenter | |
| 2004/0215642 A1 | 10/2004 | Cameron et al. | |
| 2004/0239674 A1 | 12/2004 | Ewald et al. | |
| 2004/0254909 A1 | 12/2004 | Testa | |
| 2004/0260683 A1 | 12/2004 | Chan et al. | |
| 2004/0260684 A1 | 12/2004 | Agrawal et al. | |
| 2004/0267958 A1 | 12/2004 | Reed | |
| 2004/0268236 A1 | 12/2004 | Childlovskii et al. | |
| 2005/0021548 A1 | 1/2005 | Bohannon et al. | |
| 2005/0023524 A1 | 2/2005 | Beatty | |
| 2005/0027495 A1 | 2/2005 | Matichuk | |
| 2005/0027743 A1 | 2/2005 | O'Neil et al. | |
| 2005/0028091 A1 | 2/2005 | Bordawekar | |
| 2005/0050016 A1 | 3/2005 | Stanoi et al. | |
| 2005/0050066 A1 | 3/2005 | Hughes | |
| 2005/0058976 A1 | 3/2005 | Vernon | |
| 2005/0060332 A1 | 3/2005 | Bernstein et al. | |
| 2005/0065964 A1 | 3/2005 | Ziemann et al. | |
| 2005/0125432 A1 | 6/2005 | Lin et al. | |
| 2005/0138073 A1 | 6/2005 | Zhou et al. | |
| 2005/0149471 A1 | 7/2005 | Lassalle | |
| 2005/0154265 A1 | 7/2005 | Miro et al. | |
| 2005/0154979 A1 | 7/2005 | Chidlovskii et al. | |
| 2005/0156761 A1 | 7/2005 | Oh | |
| 2005/0165732 A1 | 7/2005 | Burges | |
| 2005/0171962 A1 | 8/2005 | Martin | |
| 2005/0187900 A1 | 8/2005 | LeTourneau | |
| 2005/0214727 A1 | 9/2005 | Stoianovici et al. | |
| 2005/0216445 A1 | 9/2005 | Rao | |
| 2005/0267908 A1 | 12/2005 | LeTourneau | |
| 2005/0286788 A1 | 12/2005 | Orr | |
| 2006/0004817 A1 | 1/2006 | Andrews | |
| 2006/0005122 A1 | 1/2006 | Lemoine | |
| 2006/0015538 A1 | 1/2006 | LeTourneau | |
| 2006/0053122 A1 | 3/2006 | Korn et al. | |
| 2006/0074838 A1 | 4/2006 | Srivastava | |
| 2006/0095442 A1 | 5/2006 | LeTourneau | |
| 2006/0095455 A1 | 5/2006 | LeTourneau | |
| 2006/0123029 A1 | 6/2006 | LeTourneau | |
| 2006/0129582 A1 | 6/2006 | Schiffmann et al. | |
| 2006/0209351 A1 | 9/2006 | Saito et al. | |
| 2006/0259533 A1 | 11/2006 | LeTourneau | |
| 2006/0271573 A1 | 11/2006 | LeTourneau | |
| 2007/0003917 A1 | 1/2007 | Kitching et al. | |
| 2007/0198538 A1 | 8/2007 | Palacios | |
| 2008/0270435 A1 | 10/2008 | Furusho | |
| 2008/0313196 A1 | 12/2008 | Furusho | |
| 2010/0094885 A1 | 4/2010 | LeTourneau | |
| 2010/0094908 A1 | 4/2010 | LeTourneau | |
| 2010/0114969 A1 | 4/2010 | LeTourneau | |
| 2010/0191775 A1 | 7/2010 | Schiffmann et al. | |
| 2010/0205581 A1 | 8/2010 | LeTourneau | |
| 2012/0144388 A1 | 6/2012 | Schiffmann | |

OTHER PUBLICATIONS

"Origin Data, Inc. White Paper", © 1999, pp. 1-13.

"The Associative Model of Data White Paper", Lazy Software, Ltd., 2000.

ACM Portal Search Results (Kleene and prime and enumeration and operation and natural and numerals and sequences and "enumeration operation") conducted by Examiner on Jul. 18, 2009, 6 pages.

ACM Portal Search Results (Kleene and prime and enumeration and operation and natural and numerals and sequences and enumeration and operation) conducted by Examiner on Jul. 18, 2009, 1 page.

Alderson et al., "Toward an Optimization Driven Framework for Designing and Generating Realistic Internet Topologies" ACM SIGCOMM Computer Communications Review 41, vol. 33, No. 1, pp. 41-46, 2003.

Apostol, "A Centennial History of the Prime Number Theorem", Engineering and Science, No. 4, 1996.

Benedikt et al., "Definable Relations and First-Order Query Languages over Strings" Journal of the ACM, vol. 50, No. 5, pp. 694-751, 2003.

Cano et al., "Lazy Evaluation in Penniless Propagation over Join Trees", Networks, vol. 39(4), 2002 Wiley Periodicals, Inc., 175-185, 2002.

Cole, Richard, Hariharan, Ramesh, and Indyk, Piotr. "Tree pattern matching and subset matching in deterministic O(n log 3 n)-time", Proceedings of the Tenth Annual ACM-SIAM Symposium on Discrete Algorithms, p. 1-10, Jan. 2, 1999, Baltimore, Maryland, United States.

Cooper et al., "Oh! Pascal!", 1982, W.W. Norton & Company, Inc., Chapter 12, Arrays for Random Access, pp. 295-327.

(56) References Cited

OTHER PUBLICATIONS

Coenen, Frans; Leng, Paul and Ahmed, Shakil; "T-Trees, Vertical Partitioning and Distributed Association Rule Mining", IEEE, 2003.
Dubiner, M., Galil, Z., and Magen, E. "Faster Tree Pattern Matching. ", Journal of the Association for Computing Machinery, vol. 41, No. 2, Mar. 1994, pp. 205-213.
Durango Bill's Enumeration of Trees. http://web.archive.org/web/20021028184112/http://www.durangobill.com/Trees.html, 1998.
Er, M.C., "Enumerating Ordered Trees Lexicographically", The Computation Journal, vol. 28, Issue 5, pp. 538-542, 1985.
Google search (Kleene prime enumeration operation natural numerals sequences "Kleene prime") conducted by Examiner on Jul. 18, 2009, 2 pages.
Ferragina et al., "The String B-Tree: A New Data Structure for String Search in External Memory and Its Applications", Journal of the ACM, vol. 46, No. 2, pp. 236-280, 1999.
Google Search (Kleene prime enumeration operation natural numerals sequences "enumeration operation") conducted by Examiner on Jul. 18, 2009, 2 pages.
Google Search (Kleene prime enumeration operation) conducted by Examiner on Jul. 18, 2009, 2 pages.
Hoffman et al., "Pattern Matching in Trees", Purdue University, Jan. 1982, Journal for the Association for Computing Machinery, vol. 29, Issue 1, pp. 68-95.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
IEEE Explore Digital Library Search Result conducted by Examiner on Jul. 18, 2009, 1 page.
Johnston et al. Advances in Dataflow Programming Languages, ACM Computing Surveys, vol. 36, No. 1, pp. 1-34, 2004.
Kharbutli et al., "Using Prime Numbers for Cache Indexing to Eliminate Conflict Misses", Dept. of Electrical and Computer Engineering, North Carolina State University, Feb. 2004, 24 pages.
Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.
Knuth, "The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
Letourneau, "The Elementary Theory of Object Oriented Arithmetic", pp. 1-9, Apr. 1990.
Malhotra et al, "A Methodology for Formal Expression of Hierarchy in Model Solution", IEEE, pp. 258-267,1983.
Navarro, "A Guided Tour to Approximate String Matching", ACM Computing Surveys, vol. 33, No. 1, pp. 31-88, 2001.
Neven, Frank and Thomas Schwentick, "Expressive and efficient pattern languages for tree-structured data" Proceedings of the Nineteenth ACM SIGACT-SIGMOD-SIGART Symposium on Principles of Database Systems, May 2000.
Prasad et al., "Efficient Bit-Parallel Multi-Patterns String Matching Algorithms for Limited Expression", ACM, pp. 1-6, 2010.
Ramesh, R. and Ramakrishnan, I.V., "Nonlinear Pattern Matching in Trees." Journal of the Association for Computer Machinery, vol. 39, No. 2. Apr. 1992, pp. 295-316.
Reiss, "Semantics-Based Code Search", IEEE ICSE, pp. 243-253, 2009.
Schmidt et al., "Comparision of Tree and Graph Encodings as Function of Problem Complexity", ACM, pp. 1674-1679, 2007.
Sechrest et al., "Blending Hierarchical and Attribute-Based File Naming", Distributed Computing System, 1992, Proceedings of the $12^{th}$ International Conference on Jun. 9-12, 1992, pp. 572-580.
Shanmugasundaram et al., "Querying SML Views of Relational Data", Proceedings of the $27^{th}$ VLDB Conference, Roma, Italy, 2001, 9 pages.
Sinha et al, "Efficient Trie Based Sorting of Large Sets of Strings," ACM, pp. 1-8, 2003.
Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) Dec. 2001, pp. 1-71.
Smorynski, Craig, "Logical Number Theory I: An Introduction", Springer-Verlag Berlin Heidelberg, © 1991, Arithmetic Encoding, The Cantor Pairing Function, pp. 14-23, and 305.
Somani et al., "Phased-Mission System Analysis Using Boolean Algebraic Methods", May 1994, ACM Press, vol. 22, Issue 1.
Spinells "Declarative Peephole Optimization Using String Pattern Matching", ACM, pp. 47-51, 1999.
Sproat et al., "Compilation of Weighted Finite-State Tranducers from Decision Trees" ACM, pp. 215-222, 1996.
Stanat, D.F., and McAllister, D.F., "Discrete Mathematics in Computer Science", Prentice-Hall, 1977, Binary Relations, Ch. 3, Sec. 3.2, Trees, p. 131-145.
Talukdar, "Learning to Create Data-Integrating Queries", ACM PVLDB, pp. 785-796, 2008.
Thiemann, "Grammar-Based Analysis of String Expressions", ACM, pp. 59-70, 2005.
Valiente, "Algorithms on Trees and Graphs", Tree Isomorphism, pp. 151-251, Springer 2002.
Valiente, Gabriel, "Tree Isomorphism," of Algorithms on Trees and Graphs, Chapter 4, published by Springer, 2002, 51 pages.
Wagner et al., "The String-to-String Correction Problem", Journal of the Association for Computing Machinery, vol. 21, No. 1, pp. 168-173, 1974.
Wu, "A Prime Number Labeling Scheme for Dynamic Ordered XML Trees", IEEE, 2004, 13 pages.
Xie et al., "S-Looper: Automatice Summarization for Multipath String Loops", ACM, pp. 188-198, 2015.
Yates et al, "A New Approach to Text Searchin", Communications of the ACM, vol. 35, No. 10, pp. 74-82, 1992.
Zaks, S., "Lexicographic Generation of Ordered Trees", Dept. of Computer Science, University of Illinois, The Journal of Theoretical Computer Science, vol. 10(1), pp. 63-82, Revised 1978.
U.S. Appl. No. 11/005,859, filed Dec. 6, 2004, 120 pages.
U.S. Appl. No. 11/005,859 / Notice to File Missing parts dated Jan. 10, 2005, 2 pages.
U.S. Appl. No. 11/005,859 / Response to Notice to File Missing parts dated Apr. 1, 2005, 9 pages.
U.S. Appl. No. 11/005,859 / Preliminary Amendment filed Apr. 28, 2005, 193 pages.
U.S. Appl. No. 11/005,859 / Office Action—Restriction Requirement dated Dec. 12, 2007, 7 pages.
U.S. Appl. No. 11/005,859 / Response to Office Action—Restriction Requirement filed Jan. 14, 2008, 82 pages.
U.S. Appl. No. 11/005,859 / Non-Final Office Action dated Mar. 21, 2008, 10 pages.
U.S. Appl. No. 11/005,859 / Amendment filed Jul. 21, 2008, 86 pages.
U.S. Appl. No. 11/005,859 / Final Office Action dated Oct. 30, 2008, 14 pages.
U.S. Appl. No. 11/005,859 / Amendment filed Dec. 30, 2008, 83 pages.
U.S. Appl. No. 11/005,859 / Advisory Action dated Jan. 13, 2009, 4 pages.
U.S. Appl. No. 11/005,859 / RCE with amendment filed Apr. 30, 2009, 86 pages.
U.S. Appl. No. 11/005,859 / Final Office Action dated Jul. 8, 2009, 9 pages.
U.S. Appl. No. 11/005,859 / Examiner Interview Summary received Oct. 27, 2009, 3 pages.

(56) References Cited

OTHER PUBLICATIONS

U.S. Appl. No. 11/005,859 / Amendment filed Dec. 8, 2009, 83 pages.
U.S. Appl. No. 11/005,859 / Advisory Action dated Dec. 22, 2009, 3 pages.
U.S. Appl. No. 11/005,859 / RCE with Amendment filed Jan. 7, 2010, 85 pages.
U.S. Appl. No. 11/005,859 / Non-Final Office Action dated Jan. 21, 2010, 8 pages.
U.S. Appl. No. 11/005,859 / Response to Non-Final Office Action filed Feb. 25, 2010, 83 pages.
U.S. Appl. No. 11/005,859 / Final Office Action dated Jun. 8, 2010, 9 pages.
U.S. Appl. No. 11/005,859 / Office Action Response dated Sep. 1, 2010, 89 pages.
U.S. Appl. No. 11/005,859 / Advisory Action dated Sep. 14, 2010, 3 pages.
U.S. Appl. No. 11/005,859 / Notice of Appeal dated Sep. 29, 2010, 1 page.
U.S. Appl. No. 11/005,859 / Office Action dated Oct. 15, 2010, 5 pages.
U.S. Appl. No. 11/005,859 / Office Action Response dated Jan. 18, 2011, 95 pages.
U.S. Appl. No. 11/005,859 / Final Office Action dated Mar. 30, 2011, 7 pages.
U.S. Appl. No. 11/005,859 / Notice of Allowance and Fees Due, dated Jun. 9, 2011, 11 pages.
U.S. Appl. No. 11/005,859 / Amendment after Notice of Allowance and Issue Fee Payment, dated Sep. 9, 2011, 2 pages.
U.S. Appl. No. 11/005,859 / Issue Notification, dated Sep. 21, 2011, 1 page.
U.S. Appl. No. 13/229,624, filed Sep. 9, 2011, 139 pages.
U.S. Appl. No. 13/229,624 / Filing receipt, dated Sep. 21, 2011, 4 pages.
U.S. Appl. No. 13/229,624 / Non-Final Action, dated Nov. 23, 2011, 8 pages.
U.S. Appl. No. 13/229,624 / Notice of Publication, dated Dec. 30, 2011, 1 page.
U.S. Appl. No. 13/229,624 / Amendment, dated Feb. 23, 2012, 22 pages.
U.S. Appl. No. 13/229,624 / Final Office Action, dated Mar. 20, 2012, 10 pages.
U.S. Appl. No. 13/229,624 / Amendment after final, dated Jun. 13, 2012, 25 pages.
U.S. Appl. No. 13/229,624 / Advisory Action, dated Jun. 20, 2012, 4 pages.
U.S. Appl. No. 13/229,624 / RCE, mailed Jul. 20, 2012, 26 pages.
U.S. Appl. No. 13/229,624 / Non-Final Rejection, dated Oct. 2, 2013, 9 pages.
U.S. Appl. No. 13/229,624 / Response to non-final office action, dated Dec. 27, 2013, 11 pages.
U.S. Appl. No. 13/229,624 / Non-Final Office Action, dated Apr. 4, 2014, 5 Pages.
U.S. Appl. No. 13/229,624 / Non-Final Office Action Response, dated Aug. 1, 2014, 9 Pages.
U.S. Appl. No. 13/229,624 / Final Rejection. dated Oct. 30, 2014, 6 pages.
U.S. Appl. No. 13/229,624 / Response and Amendments after Final, filed Jan. 30, 2015, 11 pages.
U.S. Appl. No. 13/229,624 / Advisory Action, dated Mar. 11, 2015, 3 pages.
U.S. Appl. No. 13/229,624 / Applicant Initiated Interview Summary, dated Mar. 19, 2015, 3 pages.
U.S. Appl. No. 13/229,624 / Response After Final Action and Interview Summary, filed Mar. 27, 2015, 20 pages.
U.S. Appl. No. 13/229,624 / RCE and Amendments, filed Apr. 27, 2015, 17 pages.
U.S. Appl. No. 13/229,624 / Notice of Allowance and Fees, dated Jul. 6, 2015, 21 pages.
U.S. Appl. No. 13/229,624 / Issue Fee Payment, dated Sep. 28, 2015, 1 page.
U.S. Appl. No. 13/229,624 / Issue Notification, dated Oct. 14, 2015, 1 page.
U.S. Appl. No. 14/870,744, filed Sep. 30, 2015, 127 pages.
U.S. Appl. No. 14/870,744 / Preliminary Amendments, dated Oct. 6, 2015, 10 pages.
U.S. Appl. No. 14/870,744 / Notice to File Missing Parts, dated Oct. 16, 2015, 2 pages.
U.S. Appl. No. 14/870,744 / Filing Receipt, dated Oct. 16, 2015, 3 pages.
U.S. Appl. No. 14/870,744 / Applicant Response to Pre-Exam Formalities Notice, dated Feb. 19, 2016, 2 pages.
U.S. Appl. No. 14/870,744 / Filing Receipt, dated Mar. 2, 2016, 3 pages.
U.S. Appl. No. 14/870,744 / Notice of Publication, dated Jun. 9, 2016, 1 page.
U.S. Appl. No. 11/007,139 / Application filed Dec. 7, 2004, 90 pages.
U.S. Appl. No. 11/007,139 / Notice to File Missing Parts dated Jan. 19, 2005, 2 pages.
U.S. Appl. No. 11/007,139 / Response to Notice to File Missing Parts dated Apr. 1, 2005, 9 pages.
U.S. Appl. No. 11/007,139 / Preliminary Amendment filed Apr. 28, 2005, 146 pages.
U.S. Appl. No. 11/007,139 / Non-final Office Action dated May 14, 2007, 58 pages.
U.S. Appl. No. 11/007,139 / Amendment filed Oct. 15, 2007, 32 pages.
U.S. Appl. No. 11/007,139 / Supplemental Response filed Oct. 17, 2007, 7 pages.
U.S. Appl. No. 11/007,139 / Non-final Office Action dated Jan. 2, 2008 with Examiner's search results, 21 pages.
U.S. Appl. No. 11/007,139 / Amendment filed Apr. 2, 2008, 30 pages.
U.S. Appl. No. 11/007,139 / Final Office Action dated Aug. 15, 2008, 30 pages.
U.S. Appl. No. 11/007,139 / Amendment filed Oct. 15, 2008, 26 pages.
U.S. Appl. No. 11/007,139 / Advisory Action dated Oct. 22, 2008, 26 pages.
U.S. Appl. No. 11/007,139 / RCE with Amendment filed Nov. 14, 2008, 32 pages.
U.S. Appl. No. 11/007,139 / Non-final Office Action dated Dec. 8, 2008, 24 pages.
U.S. Appl. No. 11/007,139 / Amendment filed May 8, 2009, 31 pages.
U.S. Appl. No. 11/007,139 / Final Office Action dated Aug. 4, 2009, 26 pages.
U.S. Appl. No. 11/007,139 / Amendment filed Dec. 4, 2009, 28 pages.
U.S. Appl. No. 11/007,139 / Advisory Action dated Dec. 14, 2009, 4 pages.
U.S. Appl. No. 11/007,139 / RCE with amendment filed Jan. 4, 2010, 27 pages.
U.S. Appl. No. 11/007,139 / Non-Final Office Action dated Jan. 27, 2010, 31 pages.
U.S. Appl. No. 11/007,139 / Response to Non-Final Office Action filed Apr. 27, 2010, 30 pages.
U.S. Appl. No. 11/007,139 / Office Action dated Jul. 20, 2010, 20 pages.
U.S. Appl. No. 11/007,139 / Office Action response dated Oct. 20, 2010, 33 pages.
U.S. Appl. No. 11/007,139 / Advisory Action dated Oct. 25, 2010, 2 pages.
U.S. Appl. No. 11/007,139 / Office Action response dated Nov. 18, 2010, 24 pages.
U.S. Appl. No. 11/007,139 / Advisory Action dated Dec. 1, 2010, 4 pages.
U.S. Appl. No. 11/007,139 / Office Action response and Notice of Appeal dated Dec. 20, 2010, 29 pages.
U.S. Appl. No. 11/007,139 / Office Action dated Jan. 3, 2011, 24 pages.

(56) References Cited

OTHER PUBLICATIONS

U.S. Appl. No. 11/007,139 / Office Action response, dated May 3, 2011, 27 pages.
U.S. Appl. No. 11/007,139 / Final Office Action, dated Jul. 18, 2011, 23 pages.
U.S. Appl. No. 11/007,139 / Amendment after final dated Oct. 18, 2011, 30 pages.
U.S. Appl. No. 11/007,139 / Advisory Action and rule 312 amendment, dated Nov. 4, 2011, 4 pages.
U.S. Appl. No. 11/007,139 / Notice of Appeal filed Nov. 16, 2011, 1 page.
U.S. Appl. No. 11/007,139 / Appeal Brief filed May 1, 2012, 93 pages.
U.S. Appl. No. 11/007,139 / Notice of defective appeal brief, mailed May 7, 2012, 3 pages.
U.S. Appl. No. 11/007,139 / Appeal Brief filed May 15, 2012, 9 pages.
U.S. Appl. No. 11/007,139 / Examiner's answer to appeal brief, mailed Aug. 20, 2012, 35 pages.
U.S. Appl. No. 11/007,139 / Reply Brief, mailed Oct. 22, 2012, 29 pages.
U.S. Appl. No. 11/007,139 / Appeal Docketing Notice, mailed Nov. 6, 2012, 2 pages.
U.S. Appl. No. 11/007,139 / Patent Board Decision, mailed Jul. 24, 2015, 8 pages.
U.S. Appl. No. 11/007,139 / RCE, Sep. 18, 2015, 19 pages.
U.S. Appl. No. 11/007,139 / Non-Final Rejection, dated Dec. 31, 2015, 10 pages.
U.S. Appl. No. 11/007,139 / Amendment/Req. Reconsideration—After Non-Final Rejection, dated Mar. 28, 2016, 19 pages.
U.S. Appl. No. 11/007,139 / Final Rejection, dated Jun. 20, 2016, 12 pages.
U.S. Appl. No. 11/007,139 / Response After Final Action, dated Jul. 29, 2016, 17 pages.
U.S. Appl. No. 11/007,139 / Notice of Allowance and Fees, dated Aug. 23, 2016, 10 pages.
U.S. Appl. No. 11/007,139 / Filing Receipt, dated Sep. 2, 2016, 3 pages.
U.S. Appl. No. 11/007,139 / RCE, Nov. 10, 2016, 3 pages.
U.S. Appl. No. 11/007,139 / Notice of Allowance and Fees, dated Dec. 29, 2016, 8 pages.
U.S. Appl. No. 15/043,267, filed Feb. 12, 2016, 92 pages.
U.S. Appl. No. 15/043,267 / Preliminary Amendment, dated Feb. 12, 2016, 7 pages.
U.S. Appl. No. 15/043,267 / Filing Receipt, dated Mar. 7, 2016, 3 pages.
U.S. Appl. No. 15/043,267 / Preliminary Amendment, dated Jun. 10, 2016, 9 pages.
U.S. Appl. No. 15/043,267 / Filing Receipt, dated Oct. 25, 2016, 3 pages.
U.S. Appl. No. 15/043,267 / Notice of Publication, dated Feb. 2, 2017, 1 page.
U.S. Appl. No. 11/006,320, filed Dec. 6, 2004, 75 pages.
U.S. Appl. No. 11/006,320 / Response to Missing Parts and Preliminary Amendment filed May 9, 2005, 135 pages.
U.S. Appl. No. 11/006,320 / Office Action—Restriction Requirement dated Mar. 26, 2007, 7 pages.
U.S. Appl. No. 11/006,320 / Response to Restriction Requirement filed Apr. 27, 2007, 34 pages.
U.S. Appl. No. 11/006,320 / Notice of Non-Compliant Amendment dated Jul. 6, 2007, 3 pages.
U.S. Appl. No. 11/006,320 / Response to Non-Compliant Amendment filed Jul. 25, 2007, 33 pages.
U.S. Appl. No. 11/006,320 / Non-final Office Action dated Oct. 1, 2007, 24 pages.
U.S. Appl. No. 11/006,320 / Amendment filed Jan. 29, 2008, 45 pages.
U.S. Appl. No. 11/006,320 / Notice of Non-Compliant Amendment dated Apr. 8, 2008, 4 pages.
U.S. Appl. No. 11/006,320 / Amendment filed May 5, 2008, 44 pages.
U.S. Appl. No. 11/006,320 / Non-Final Office Action dated Aug. 15, 2008, 33 pages.
U.S. Appl. No. 11/006,320 / Amendment filed Nov. 14, 2008, 40 pages.
U.S. Appl. No. 11/006,320 / Office Action—Shortened Statutory Period dated Jan. 27, 2009, 2 pages.
U.S. Appl. No. 11/006,320 / Amendment filed Apr. 27, 2009, 44 pages.
U.S. Appl. No. 11/006,320 / Final Office Action dated Jul. 29, 2009, 13 pages.
U.S. Appl. No. 11/006,320 / Amendment filed Nov. 30, 2009, 10 pages.
U.S. Appl. No. 11/006,320 / Non-final Office Action dated Dec. 4, 2009, 25 pages.
U.S. Appl. No. 11/006,320 / Response to Non-Final Office Action filed Feb. 23, 2010, 11 pages.
U.S. Appl. No. 11/006,320 / Final Office Action dated May 24, 2010, 11 pages.
U.S. Appl. No. 11/006,320 / Office Action response dated Aug. 24, 2010, 15 pages.
U.S. Appl. No. 11/006,320 / Notice of Allowance dated Sep. 17, 2010, 8 pages.
U.S. Appl. No. 11/006,320 / Examiner Interview Summary and supplemental Notice of Allowance dated Dec. 17, 2010, 9 pages.
U.S. Appl. No. 11/006,320 / Rule 312 Amendment and Issue Fee payment dated Dec. 17, 2010, 10 pages.
U.S. Appl. No. 11/006,320 / Issue Notification dated Jan. 12, 2011, 1 page.
U.S. Appl. No. 12/972,326, filed Dec. 17, 2010, 74 pages.
U.S. Appl. No. 12/972,326 / Filing receipt and Notice to File Missing Parts dated Jan. 6, 2011, 5 pages.
U.S. Appl. No. 12/972,326 / Response to Notice to File Missing parts dated Jan. 26, 2011, 14 pages.
U.S. Appl. No. 12/972,326 / Filing Receipt, dated Feb. 18, 2011, 3 pages.
U.S. Appl. No. 12/972,326 / Preliminary amendment dated May 20, 2011, 15 pages.
U.S. Appl. No. 12/972,326 / Notice of publication and non-compliant amendment dated Jun. 2, 2011, 3 pages.
U.S. Appl. No. 12/972,326 / Preliminary amendment dated Jul. 5, 2011, 21 pages.
U.S. Appl. No. 12/972,326 / Notice of additional fee due, dated Jul. 12, 2011, 2 pages.
U.S. Appl. No. 12/972,326 / Preliminary Amendment dated Aug. 10, 2011, 7 pages.
U.S. Appl. No. 12/972,326 / Non-Final Office Action, dated Feb. 23, 2012, 9 pages.
U.S. Appl. No. 12/972,326 / Abandonment, dated Sep. 18, 2012, 2 pages.
U.S. Appl. No. 13/014,677, filed Jan. 26, 2011, 90 pages.
U.S. Appl. No. 13/014,677 / Notice to file missing parts and filing receipt, dated Mar. 23, 2011, 5 pages.
U.S. Appl. No. 13/014,677 / Notice of Abandonment dated Nov. 29, 2011, 2 pages.
U.S. Appl. No. 11/006,848, filed Dec. 7, 2004, 59 pages.
U.S. Appl. No. 11/006,848 / Notice to File Missing Parts dated Mar. 18, 2005, 2 pages.
U.S. Appl. No. 11/006,848 / Response to Notice to File Missing Parts dated May 3, 2005, 101 pages.
U.S. Appl. No. 11/006,848 / Non-Final Office Action dated Apr. 4, 2007, 11 pages.
U.S. Appl. No. 11/006,848 / Response to Non-Final Office Action dated Oct. 3, 2007, 20 pages.
U.S. Appl. No. 11/006,848 / Supplemental Amendment dated Nov. 13, 2007, 4 pages.
U.S. Appl. No. 11/006,848 / Non-Final Office Action dated Feb. 5, 2008, 16 pages.
U.S. Appl. No. 11/006,848 / Response to Non-Final Office Action filed Aug. 4, 2008, 27 pages.
U.S. Appl. No. 11/006,848 / Final Office Action dated Dec. 2, 2008, 30 pages.

(56) References Cited

OTHER PUBLICATIONS

U.S. Appl. No. 11/006,848 / RCE filed May 4, 2009, 24 pages.
U.S. Appl. No. 11/006,848 / Notice of Allowance dated Jun. 11, 2009, 8 pages.
U.S. Appl. No. 11/006,848 / Issue fee dated Sep. 11, 2009, 10 pages.
U.S. Appl. No. 11/006,848 / Issue Notification dated Oct. 28, 2009, 1 page.
U.S. Appl. No. 12/573,829, filed Oct. 5, 2009, 64 pages.
U.S. Appl. No. 12/573,829 / Notice to File Missing Parts and Filing Receipt dated Oct. 20, 2009, 5 pages.
U.S. Appl. No. 12/573,829 / Preliminary Amendment dated Dec. 21, 2009, 17 pages.
U.S. Appl. No. 12/573,829 / Filing receipt dated Jan. 4, 2010, 5 pages.
U.S. Appl. No. 12/573,829 / Notice of Publication dated Apr. 15, 2010, 1 page.
U.S. Appl. No. 12/573,829 / Office Action dated Jun. 28, 2010, 35 pages.
U.S. Appl. No. 12/573,829 / Office Action Response dated Sep. 28, 2010, 22 pages.
U.S. Appl. No. 12/573,829 / Office Action dated Nov. 1, 2010, 29 pages.
U.S. Appl. No. 12/573,829 / Office Action Response dated Jan. 3, 2011, 29 pages.
U.S. Appl. No. 12/573,829 / Advisory Action dated Jan. 7, 2011, 3 pages.
U.S. Appl. No. 12/573,829 / Notice of Appeal mailed Jan. 11, 2011, 1 page.
U.S. Appl. No. 12/573,829 / Appeal Brief, mailed May 4, 2011, 68 pages.
U.S. Appl. No. 12/573,829 / Examiner's Answer to Appeal Brief, mailed Jul. 21, 2011, 31 pages.
U.S. Appl. No. 12/573,829 / Reply brief filed Sep. 21, 2011, 17 pages.
U.S. Appl. No. 12/573,829 / Reply brief noted Oct. 5, 2011, 2 pages.
U.S. Appl. No. 12/573,829 / Appeal Docketing notice Oct. 11, 2011, 2 pages.
U.S. Appl. No. 12/573,829 / Appeal Board Decision, mailed May 9, 2014, 10 pages.
U.S. Appl. No. 12/573,829 / Request for continued examination, dated Jul. 9, 2014, 19 pages.
U.S. Appl. No. 12/573,829 / Non-Final Rejection and Examiner's Search, dated Apr. 28, 2015, 22 pages.
U.S. Appl. No. 12/573,829 / Amendment/Req. Reconsideration After Non-Final Rejection, filed Jul. 27, 2015, 21 pages.
U.S. Appl. No. 12/573,829 / Final Rejection and Examiner search, dated Sep. 15, 2015, 17 pages.
U.S. Appl. No. 12/573,829 / Response After Final Action, dated Nov. 16, 2015, 17 pages.
U.S. Appl. No. 12/573,829 / Advisory Action, dated Dec. 2, 2015, 4 pages.
U.S. Appl. No. 12/573,829 / Request for Continued Examination and Amendments, dated Dec. 14, 2015, 17 pages.
U.S. Appl. No. 12/573,829 / Non-Final Rejection, dated Jun. 13, 2016, 18 pages.
U.S. Appl. No. 12/573,829 / Amendment/Req. Reconsideration—After Non-Final Reject, dated Sep. 13, 2016, 24 pages.
U.S. Appl. No. 12/573,829 / Filing Receipt, dated Sep. 15, 2016, 3 pages.
U.S. Appl. No. 12/573,829 / Non-Final Rejection, dated Dec. 16, 2016, 10 pages.
U.S. Appl. No. 12/573,829 / Amendment/Req. Reconsideration—After Non-Final Reject, dated Mar. 16, 2017, 18 pages.
U.S. Appl. No. 11/006,841, filed Dec. 7, 2004, 63 pages.
U.S. Appl. No. 11/006,841 / Notice to file missing parts dated Jan. 10, 2005, 2 pages.
U.S. Appl. No. 11/006,841 / Response to Notice to file missing parts and preliminary amendment dated Apr. 14, 2005, 105 pages.
U.S. Appl. No. 11/006,841 / Non-Final OA mailed Apr. 6, 2007, 16 pages.
U.S. Appl. No. 11/006,841 / Response to Non-Final OA mailed Sep. 6, 2007, 63 pages.
U.S. Appl. No. 11/006,841 / Restriction Requirement dated Nov. 27, 2007, 5 pages.
U.S. Appl. No. 11/006,841 / Restriction Requirement response dated Dec. 27, 2007, 36 pages.
U.S. Appl. No. 11/006,841 / Restriction Requirement dated Mar. 17, 2008, 9 pages.
U.S. Appl. No. 11/006,841 / Response to Restriction Requirement dated Jul. 17, 2008, 33 pages.
U.S. Appl. No. 11/006,841 / Final Office Action dated Oct. 29, 2008, 54 pages.
U.S. Appl. No. 11/006,841 / Response to Final Office Action dated Dec. 29, 2008, 45 pages.
U.S. Appl. No. 11/006,841 / Advisory Action dated Jan. 6, 2009, 3 pages.
U.S. Appl. No. 11/006,841 / RCE mailed Apr. 23, 2009, 48 pages.
U.S. Appl. No. 11/006,841 / Supplemental Response mailed Jun. 26, 2009, 34 pages.
U.S. Appl. No. 11/006,841 / Notice of Allowance dated Jun. 29, 2009, 40 pages.
U.S. Appl. No. 11/006,841 / Issue Fee dated Sep. 29, 2009, 4 pages.
U.S. Appl. No. 11/006,841 / Issue Notification dated Nov. 11, 2009, 1 page.
U.S. Appl. No. 12/578,411 / Continuation application filed Oct. 13, 2009, 75 pages.
U.S. Appl. No. 12/578,411 / Notice of Missing Parts dated Oct. 28, 2009, 6 pages.
U.S. Appl. No. 12/578,411 / Response to Missing Parts filed Dec. 28, 2009, 25 pages.
U.S. Appl. No. 12/578,411 / Filing Receipt dated Jan. 7, 2010, 3 pages.
U.S. Appl. No. 12/578,411 / Notice of Publication dated Apr. 15, 2010, 1 page.
U.S. Appl. No. 12/578,411 / Restriction requirement dated Jun. 8, 2011, 6 pages.
U.S. Appl. No. 12/578,411 / Response to restriction requirement dated Jul. 6, 2011, 19 pages.
U.S. Appl. No. 12/578,411 / Non-Final Office Action, dated Aug. 23, 2011, 19 pages.
U.S. Appl. No. 12/578,411 / Non-Final Office Action response dated Dec. 22, 2011, 38 pages.
U.S. Appl. No. 12/578,411 / Final Rejection dated Jan. 20, 2012, 16 pages.
U.S. Appl. No. 12/578,411 / Amendment, dated May 21, 2012, 23 pages.
U.S. Appl. No. 12/578,411 / Advisory Action, dated May 31, 2012, 4 pages.
U.S. Appl. No. 12/578,411 / RCE, mailed Jun. 12, 2012, 38 pages.
U.S. Appl. No. 12/578,411 / Notice of Allowance, dated Aug. 19, 2013, 19 pages.
U.S. Appl. No. 12/578,411 / Issue fee payment and Rule 312 amendment, dated Nov. 14, 2013, 14 pages.
U.S. Appl. No. 12/578,411 / Examiner response to rule 312 amendment, dated Nov. 19, 2013, 2 pages.
U.S. Appl. No. 12/578,411 / Response to Amendment under rule 312, dated Dec. 3, 2013, 3 pages.
U.S. Appl. No. 12/578,411 / Issue Notification, dated Dec. 18, 2013, 1 page.
U.S. Appl. No. 14/086,837, filed Nov. 21, 2013, 68 Pages.
U.S. Appl. No. 14/086,837 / Notice to File Missing Parts, dated Dec. 12, 2013, 5 Pages.
U.S. Appl. No. 14/086,837 / Applicant Response to Pre-Exam Formalities Notice, dated Jun. 11, 2014, 26 Pages.
U.S. Appl. No. 14/086,837 / Notice of Publication, dated Sep. 25, 2014, 4 Pages.
U.S. Appl. No. 14/086,837 / Terminal Disclaimer, Filed Nov. 14, 2014, 1 page.
U.S. Appl. No. 14/086,837 / Examiner's search strategy and results, dated Dec. 2, 2014, 9 pages.
U.S. Appl. No. 14/086,837 / Notice of Allowance and Fees, dated Dec. 2, 2014, 17 pages.

(56) References Cited

OTHER PUBLICATIONS

U.S. Appl. No. 14/086,837 / Amendment After Notice of Allowance, filed Feb. 27, 2015, 9 pages.
U.S. Appl. No. 14/086,837 / Issue Fee Payment, filed Feb. 27, 2015, 1 page.
U.S. Appl. No. 14/086,837 / Issue Notification, dated May 6, 2015, 1 page.
U.S. Appl. No. 14/635,836, filed Mar. 2, 2015, 70 pages.
U.S. Appl. No. 14/635,836 / Filing Receipt, dated Mar. 12, 2015, 3 pages.
U.S. Appl. No. 14/635,836 / Notice to File Missing Parts, dated Mar. 12, 2015, 2 pages.
U.S. Appl. No. 14/635,836 / Applicant Response to Pre-Exam Formalities Notice, filed May 12, 2015, 40 pages.
U.S. Appl. No. 14/635,836 / Filing Receipt, dated May 19, 2015, 3 pages.
U.S. Appl. No. 14/635,836 / Notice of Publication, dated Aug. 27, 2015, 1 page.
U.S. Appl. No. 14/635,836 / Electronic Terminal Disclaimer Approved and Filed, Nov. 13, 2015, 3 pages.
U.S. Appl. No. 14/635,836 / Notice of Allowance and Fees Due, dated Apr. 18, 2016, 25 pages.
U.S. Appl. No. 14/635,836 / Issue Fee Payment and Amendment after NOA, dated Jul. 15, 2016, 15 pages.
U.S. Appl. No. 14/635,836 / Response to Amendment under Rule 312, dated Jul. 21, 2016, 1 page.
U.S. Appl. No. 14/635,836 / Response to Amendment under Rule 312, dated Jul. 22, 2016, 2 page.
U.S. Appl. No. 14/635,836 / Issue Notification, dated Aug. 10, 2016, 1 page.
U.S. Appl. No. 11/006,440, filed Dec. 6, 2004, 85 pages.
U.S. Appl. No. 11/006,440 / Notice to file missing parts dated Jan. 11, 2005, 2 pages.
U.S. Appl. No. 11/006,440 / Response to Notice to file missing parts dated Mar. 15, 2005, 8 pages.
U.S. Appl. No. 11/006,440 / Preliminary Amendment dated Apr. 28, 2005, 140 pages.
U.S. Appl. No. 11/006,440 / Preliminary Amendment and Substitute Specification dated Oct. 10, 2006, 139 pages.
U.S. Appl. No. 11/006,440 / Restriction Requirement dated Mar. 29, 2007, 5 pages.
U.S. Appl. No. 11/006,440 / Response to Restriction Requirement dated Apr. 30, 2007, 42 pages.
U.S. Appl. No. 11/006,440 / Non-Final Office Action dated Jun. 21, 2007, 15 pages.
U.S. Appl. No. 11/006,440 / Response to Non-Final Office Action dated Nov. 20, 2007, 42 pages.
U.S. Appl. No. 11/006,440 / Final Office Action dated Feb. 6, 2008, 13 pages.
U.S. Appl. No. 11/006,440 / Response to Final Office Action dated Apr. 7, 2008, 34 pages.
U.S. Appl. No. 11/006,440 / Advisory Action dated May 9, 2008, 3 pages.
U.S. Appl. No. 11/006,440 / Notice of appeal mailed Aug. 4, 2008, 1 page.
U.S. Appl. No. 11/006,440 / RCE mailed Nov. 4, 2008, 39 pages.
U.S. Appl. No. 11/006,440 / Final Office Action dated Jan. 23, 2009, 22 pages.
U.S. Appl. No. 11/006,440 / Amendment after Final dated Apr. 23, 2009, 34 pages.
U.S. Appl. No. 11/006,440 / Supplemental Amendment dated Jul. 17, 2009, 29 pages.
U.S. Appl. No. 11/006,440 / Notice of Allowance dated Jul. 31, 2009, 15 pages.
U.S. Appl. No. 11/006,440 / Examiner's Amendment and Reasons for Allowance dated Sep. 3, 2009, 9 pages.
U.S. Appl. No. 11/006,440 / Issue Fee dated Nov. 2, 2009, 12 pages.
U.S. Appl. No. 11/006,440 / Issue Notification dated Dec. 2, 2009, 1 page.
U.S. Appl. No. 12/627,816 / Continuation application filed Nov. 30, 2009, 95 pages.
U.S. Appl. No. 12/627,816 / Notice of Missing Parts dated Dec. 15, 2009, 2 pages.
U.S. Appl. No. 12/627,816 / Response to Missing Parts filed Apr. 12, 2010, 21 pages.
U.S. Appl. No. 12/627,816 / Filing Receipt dated Apr. 20, 2010, 3 pages.
U.S. Appl. No. 12/627,816 / Notice of Publication dated Jul. 29, 2010, 1 page.
U.S. Appl. No. 12/627,816 / Non-Final OA, mailed May 5, 2011, 19 pages.
U.S. Appl. No. 12/627,816 / Non-Final OA response, mailed Nov. 7, 2011, 12 pages.
U.S. Appl. No. 12/627,816 / Final Rejection dated Nov. 17, 2011, 18 pages.
U.S. Appl. No. 12/627,816 / RCE mailed Feb. 17, 2012, 20 pages.
U.S. Appl. No. 12/627,816 / Terminal disclaimer review, mailed Mar. 7, 2012, 1 page.
U.S. Appl. No. 12/627,816 / Notice of Allowance, dated Aug. 1, 2013, 16 pages.
U.S. Appl. No. 12/627,816 / Issue fee payment and Rule 312 amendment, dated Nov. 1, 2013, 14 pages.
U.S. Appl. No. 12/627,816 / Examiner response to rule 312 amendment, dated Nov. 13, 2013, 2 pages.
U.S. Appl. No. 12/627,816 / Issue Notification, dated Nov. 26, 2013, 1 page.
U.S. Appl. No. 14/086,808, filed Nov. 21, 2013, 87 Pages.
U.S. Appl. No. 14/086,808 / Notice to File Missing Parts and Filing Receipt, dated Dec. 11, 2013, 5 Pages.
U.S. Appl. No. 14/086,808 / Applicant Response to Pre-Exam Formalities Notice, dated Jun. 11, 2014, 53 Pages.
U.S. Appl. No. 14/086,808 / Filing Receipt, dated Jun. 17, 2014, 3 Pages.
U.S. Appl. No. 14/086,808 / Notice of Publication, dated Sep. 25, 2014, 1 Page.
U.S. Appl. No. 14/086,808 / Terminal Disclimer, Filed Oct. 24, 2014, 2 pages.
U.S. Appl. No. 14/086,808 / Terminal Disclaimer Review Decision, Mailed Oct. 29, 2014, 1 page.
U.S. Appl. No. 14/086,808 / Terminal Disclaimer, Filed Nov. 4, 2014, 2 pages.
U.S. Appl. No. 14/086,808 / Terminal Disclaimer Review Decision, Mailed Nov. 13, 2014, 1 page.
U.S. Appl. No. 14/086,808 / Examiner's search strategy and results, dated Nov. 17, 2014, 5 pages.
U.S. Appl. No. 14/086,808 / Notice of Allowance and fees, dated Nov. 17, 2014, 16 pages.
U.S. Appl. No. 14/086,808 / Issue Fee Payment and Rule 312 amendment, filed Feb. 17, 2015, 1 page.
U.S. Appl. No. 14/086,808 / Amendment After Notice of Allowance, dated Feb. 17, 2015, 17 pages.
U.S. Appl. No. 14/086,808 / Response to Amendment under Rule 312, dated Feb. 20, 2015, 2 pages.
U.S. Appl. No. 14/086,808 / Response to Amendment under Rule 312, dated Feb. 25, 2015, 3 pages.
U.S. Appl. No. 14/086,808 / Issue Notification, dated Mar. 18, 2015, 1 page.
U.S. Appl. No. 14/625,473, filed Feb. 18, 2015, 92 pages.
U.S. Appl. No. 14/625,473 / Filing Receipt, dated Mar. 18, 2015, 3 pages.
U.S. Appl. No. 14/625,473 / Notice to File Missing Parts, dated Mar. 18, 2015.
U.S. Appl. No. 14/625,473 / Response to Pre-Exam Formalities Notice and Preliminary Amendment, filed May 18, 2015, 28 pages.
U.S. Appl. No. 14/625,473 / Filing Receipt, dated May 20, 2015, 3 pages.
U.S. Appl. No. 14/625,473 / Notice of Publication, dated Aug. 27, 2015, 1 page.
U.S. Appl. No. 14/625,473 / Electronic Terminal Disclaimer Filed and Approved, Nov. 13, 2015, 3 pages.
U.S. Appl. No. 14/625,473 / Notice of Allowance, dated Mar. 28, 2016, 19 pages.

(56) References Cited

OTHER PUBLICATIONS

U.S. Appl. No. 14/625,473 / Isse Fee Payment and Amendments after Notice of Allowance, dated Jun. 28, 2016, 24 pages.
U.S. Appl. No. 14/625,473 / Response to Amendment under Rule 312, dated Jun. 30, 2016, 1 page.
U.S. Appl. No. 14/625,473 / Issue Notification, dated Jul. 20, 2016, 1 page.
U.S. Appl. No. 15/214,168 / Application as filed with preliminary amendments, dated Jul. 19, 2016, 116 pages.
U.S. Appl. No. 15/214,168 / Filing Receipt, dated Aug. 3, 2016, 4 pages.
U.S. Appl. No. 15/214,168 / Corrected Filing Receipt, dated Oct. 12, 2016, 4 pages.
U.S. Appl. No. 15/214,168 / Notice of Publication, dated Nov. 10, 2016, 1 page.
U.S. Appl. No. 15/214,168 / Non-Final Rejection, dated Mar. 2, 2017, 20 pages.
U.S. Appl. No. 11/006,446, filed Dec. 6, 2004, 91 pages.
U.S. Appl. No. 11/006,446 / Notice of Missing Parts dated Jan. 24, 2005, 3 pages.
U.S. Appl. No. 11/006,446 / Response to Notice to File Missing Parts dated Mar. 29, 2005, 8 pages.
U.S. Appl. No. 11/006,446 / Preliminary Amendment filed Apr. 28, 2005, 118 pages.
U.S. Appl. No. 11/006,446 / Office Action—Restriction Requirement dated Apr. 4, 2007, 5 pages.
U.S. Appl. No. 11/006,446 / Response to Office Action—Restriction Requirement filed May 3, 2007, 6 pages.
U.S. Appl. No. 11/006,446 / Non-final Office Action dated Jul. 26, 2007, 45 pages.
U.S. Appl. No. 11/006,446 / Amendment filed Nov. 26, 2007, 38 pages.
U.S. Appl. No. 11/006,446 / Non-final Office Action dated Feb. 20, 2008, 67 pages.
U.S. Appl. No. 11/006,446 / Amendment filed Jul. 21, 2008, 33 pages.
U.S. Appl. No. 11/006,446 / Final Office Action dated Oct. 28, 2008, 49 pages.
U.S. Appl. No. 11/006,446 / Amendment filed Dec. 29, 2008, 33 pages.
U.S. Appl. No. 11/006,446 / Advisory Action dated Jan. 7, 2009, 4 pages.
U.S. Appl. No. 11/006,446 / RCE with Amendment filed Apr. 28, 2009, 38 pages.
U.S. Appl. No. 11/006,446 / Non-final Office Action dated Jul. 7, 2009, 41 pages.
U.S. Appl. No. 11/006,446 / Examiner Interview Summary and Search Results dated Oct. 26, 2009, 6 pages.
U.S. Appl. No. 11/006,446 / Amendment dated Dec. 7, 2009, 33 pages.
U.S. Appl. No. 11/006,446 / Examiner Interview Summary dated Mar. 19, 2010, 4 pages.
U.S. Appl. No. 11/006,446 / Notice of Allowance/Allowability dated Mar. 19, 2010, 29 pages.
U.S. Appl. No. 11/006,446 / Issue Fee Payment and 312 Amendment filed Jun. 21, 2010, 23 pages.
U.S. Appl. No. 11/006,446 / Rule 312 Amendment dated Aug. 19, 2010, 2 pages.
U.S. Appl. No. 11/006,446 / Formal drawings mailed Aug. 25, 2010, 29 pages.
U.S. Appl. No. 11/006,446 / Issue Notification dated Sep. 1, 2010, 1 page.
U.S. Appl. No. 12/830,236 / Divisional Application filed Jul. 2, 2010, 103 pages.
U.S. Appl. No. 12/830,236 / Notice to File Corrected Application Papers dated Jul. 16, 2010, 5 pages.
U.S. Appl. No. 12/830,236 / Response to Notice to File Corrected Application Papers dated Aug. 25, 2010, 32 pages.
U.S. Appl. No. 12/830,236 / Filing receipt dated Sep. 3, 2010, 3 pages.
U.S. Appl. No. 12/830,236 / Notice of Publication dated Dec. 16, 2010, 1 page.
U.S. Appl. No. 12/830,236 / Restriction requirement dated Mar. 18, 2011, 6 pages.
U.S. Appl. No. 12/830,236 / Restriction requirement response, dated Apr. 18, 2011, 5 pages.
U.S. Appl. No. 12/830,236 / Non-Final Office Action, dated May 11, 2011, 10 pages.
U.S. Appl. No. 12/830,236 / Response to Non-Final Office Action dated Jul. 6, 2011, 18 pages.
U.S. Appl. No. 12/830,236 / Final Office Action, dated Oct. 14, 2011, 18 pages.
U.S. Appl. No. 12/830,236 / Amendment after final, filed Jan. 17, 2012, 26 pages.
U.S. Appl. No. 12/830,236 / Advisory Action, dated Feb. 8, 2012, 6 pages.
U.S. Appl. No. 12/830,236 / Notice of Appeal filed Mar. 8, 2012, 3 pages.
U.S. Appl. No. 12/830,236 / RCE, filed Jun. 5, 2012, 23 pages.
U.S. Appl. No. 12/830,236 / Non-Final Office Action, dated Jul. 31, 2012, 18 pages.
U.S. Appl. No. 12/830,236 / Amendment, filed Nov. 1, 2012, 27 pages.
U.S. Appl. No. 12/830,236 / Final Office Action, dated Feb. 27, 2013, 35 pages.
U.S. Appl. No. 12/830,236 / Response after final, dated Jun. 27, 2013, 36 pages.
U.S. Appl. No. 12/830,236 / Advisory Action, dated Jul. 12, 2013, 4 pages.
U.S. Appl. No. 12/830,236 / Notice of appeal, filed Jul. 19, 2013, 2 pages.
U.S. Appl. No. 12/830,236 / Appeal brief, filed Sep. 18, 2013, 44 pages.
U.S. Appl. No. 12/830,236 / Examiners answer to appeal brief, mailed Dec. 18, 2013, 35 pages.
U.S. Appl. No. 12/830,236 / Reply Brief as Filed on Feb. 18, 2014, 16 Pages.
U.S. Appl. No. 12/830,236 / Appeal Docketing Notice, Mailed Mar. 21, 2014, 2 Pages.
U.S. Appl. No. 12/830,236 / Patent Board Decision, Mar. 9, 2016, 6 pages.
U.S. Appl. No. 12/830,236 / RCE and Amendments, dated Apr. 27, 2016, 15 pages.
U.S. Appl. No. 12/830,236 / Non-Final Rejection and Examiner Search, dated Jun. 29, 2016, 75 pages.
U.S. Appl. No. 12/830,236 / Amendment/Req. Reconsideration—After Non-Final Reject, dated Sep. 6, 2016, 12 pages.
U.S. Appl. No. 12/830,236 / Final Rejection, dated Dec. 14, 2016, 22 pages.
U.S. Appl. No. 12/830,236 / Response After Final Action, dated Feb. 13, 2017, 14 pages.
U.S. Appl. No. 12/830,236 / Advisory Action, dated Mar. 3, 2017, 2 pages.
U.S. Appl. No. 11/385,257, filed Mar. 20, 2006, 118 pages.
U.S. Appl. No. 11/385,257 / Notice of Missing Parts dated May 3, 2006, 2 pages.
U.S. Appl. No. 11/385,257 / Response to Missing Parts filed Aug. 3, 2006, 46 pages.
U.S. Appl. No. 11/385,257 / Notice of Publication dated Nov. 30, 2006, 1 page.
U.S. Appl. No. 11/385,257 / Non-final Office Action dated Apr. 29, 2008, 44 pages.
U.S. Appl. No. 11/385,257 / Amendment filed Jul. 29, 2008, 29 pages.
U.S. Appl. No. 11/385,257 / Final Office Action dated Dec. 9, 2008, 47 pages.
U.S. Appl. No. 11/385,257 / RCE with Amendment filed May 11, 2009, 38 pages.
U.S. Appl. No. 11/385,257 / Supplemental Amendment filed May 26, 2009, 32 pages.
U.S. Appl. No. 11/385,257 / Notice of Non-Compliant Amendment dated Jun. 1, 2009, 3 pages.

(56) References Cited

OTHER PUBLICATIONS

U.S. Appl. No. 11/385,257 / Amendment filed Jun. 30, 2009, 34 pages.
U.S. Appl. No. 11/385,257 / Non-final Office Action dated Sep. 14, 2009, 60 pages.
U.S. Appl. No. 11/385,257 / Response to Non-Final Office Action filed Jan. 13, 2010, 34 pages.
U.S. Appl. No. 11/385,257 / Final Office Action dated Apr. 12, 2010, 47 pages.
U.S. Appl. No. 11/385,257 / RCE mailed Aug. 12, 2010, 35 pages.
U.S. Appl. No. 11/385,257 / Office Action dated Sep. 30, 2010, 39 pages.
U.S. Appl. No. 11/385,257 / Office Action response, dated Mar. 29, 2011, 31 pages.
U.S. Appl. No. 11/385,257 / Final Rejection dated Jun. 1, 2011, 40 pages.
U.S. Appl. No. 11/385,257 / Request for continued Examination dated Nov. 1, 2011, 30 pages.
U.S. Appl. No. 11/385,257 / Non-Final Office Action, dated Jan. 9, 2012, 40 pages.
U.S. Appl. No. 11/385,257 / Amendment, dated Apr. 6, 2012, 30 pages.
U.S. Appl. No. 11/385,257 / Notice of allowance and Examiner interview summary, dated Jun. 22, 2012, 36 pages.
U.S. Appl. No. 11/385,257 / Office communication concerning previous IDS filing, dated Oct. 4, 2012, 4 pages.
U.S. Appl. No. 11/385,257 / Miscellaneous Communication to Applicant, dated Oct. 15, 2012, 3 pages.
U.S. Appl. No. 11/385,257 / Rule 312 Amendment, dated Dec. 12, 2012, 10 pages.
U.S. Appl. No. 11/385,257 / Issue Notification, dated Dec. 22, 2012, 1 page.
U.S. Appl. No. 13/625,812, filed Sep. 24, 2012, 123 pages.
U.S. Appl. No. 13/625,812 / Notice to file missing parts, dated Oct. 15, 2012, 6 pages.
U.S. Appl. No. 13/625,812 / Response to Notice to file missing parts and preliminary amendment, dated Mar. 8, 2013, 47 pages.
U.S. Appl. No. 13/625,812 / Notice of incomplete reply, dated Mar. 15, 2013, 3 pages.
U.S. Appl. No. 13/625,812 / Response to incomplete reply notice, dated Apr. 2, 2013, 5 pages.
U.S. Appl. No. 13/625,812 / Non-Final office action, dated Jul. 26, 2013, 29 pages.
U.S. Appl. No. 13/625,812 / Publication notice, mailed Aug. 1, 2013, 1 page.
U.S. Appl. No. 13/625,812 / Response to non-final office action, dated Oct. 9, 2013, 15 pages.
U.S. Appl. No. 13/625,812 / Final rejection, dated Dec. 3, 2013, 28 pages.
U.S. Appl. No. 13/625,812 / Response After Final Action, dated Apr. 1, 2014, 1 Page.
U.S. Appl. No. 13/625,812 / Advisory Action (PTOL-303), dated Apr. 9, 2014, 3 Pages.
U.S. Appl. No. 13/625,812 / Notice of Appeal, filed May 5, 2014, 1 Page.
U.S. Appl. No. 13/625,812 / Request for Continued Examination, dated Aug. 4, 2014, 18 Pages.
U.S. Appl. No. 13/625,812 / Request for Corrected Filing Receipt, dated Aug. 21, 2014, 6 Pages.
U.S. Appl. No. 13/625,812 / Filing Receipt, dated Aug. 27, 2014, 3 Pages.
U.S. Appl. No. 13/625,812 / Notice of Allowance and Fees, dated Dec. 9, 2014, 20 pages.
U.S. Appl. No. 13/625,812 / Filing Receipt, dated Feb. 2, 2015, 3 pages.
U.S. Appl. No. 13/625,812 / Filing Receipt, dated Feb. 6, 2015, 3 pages.
U.S. Appl. No. 13/625,812 / Terminal Disclaimer Filed Mar. 2, 2015, 1 page.
U.S. Appl. No. 13/625,812 / Post Allowance Arguments/Amendments, filed Mar. 6, 2015, 6 pages.
U.S. Appl. No. 13/625,812 / Amendment After Notice of Allowance, filed Mar. 9, 2015, 3 pages.
U.S. Appl. No. 13/625,812 / Issue Fee Payment, filed Mar. 9, 2015, 1 page.
U.S. Appl. No. 13/625,812 / Terminal Disclaimer Review Decision, mailed Mar. 12, 2015.
U.S. Appl. No. 14/641,735, filed Mar. 9, 2015, 126 pages.
U.S. Appl. No. 14/641,735 / Filing Receipt, dated Mar. 20, 2015, 3 pages.
U.S. Appl. No. 14/641,735 / Notice to File Missing Parts, dated Mar. 20, 2015, 2 pages.
U.S. Appl. No. 14/641,735 / Notice of Incomplete Reply, dated Jun. 26, 2015, 2 pages.
U.S. Appl. No. 14/641,735 / Applicant Respose to Pre-Exam Formalities Notice and Amendments, filed Jul. 8, 2015, 32 pages.
U.S. Appl. No. 14/641,735 / Electronic Terminal Disclaimer, filed Aug. 27, 2015, 3 pages.
U.S. Appl. No. 14/641,735 / Notice of Publication, dated Oct. 29, 2015, 1 page.
U.S. Appl. No. 14/641,735 / Preliminary Amendment, dated Jan. 14, 2016, 8 pages.
U.S. Appl. No. 11/319,758, filed Dec. 27, 2005, 79 pages.
U.S. Appl. No. 11/319,758 / Notice of Missing Parts dated Feb. 1, 2006, 2 pages.
U.S. Appl. No. 11/319,758 / Response to Missing Parts filed Jul. 3, 2006, 15 pages.
U.S. Appl. No. 11/319,758 / Non-final Office Action dated Nov. 12, 2008, 46 pages.
U.S. Appl. No. 11/319,758 / Amendment filed May 12, 2009, 40 pages.
U.S. Appl. No. 11/319,758 / Final Office Action dated Aug. 3, 2009, 39 pages.
U.S. Appl. No. 11/319,758 / RCE filed Jan. 4, 2010, 45 pages.
U.S. Appl. No. 11/319,758 / Non-Final Office Action dated Mar. 30, 2010, 39 pages.
U.S. Appl. No. 11/319,758 / Office Action response dated Jul. 29, 2010, 30 pages.
U.S. Appl. No. 11/319,758 / Final Office Action dated Oct. 28, 2010, 31 pages.
U.S. Appl. No. 11/319,758 / Request for Continued Examination, dated Mar. 28, 2011, 32 pages.
U.S. Appl. No. 11/319,758 / Non-Final office action dated Jun. 3, 2011, 31 pages.
U.S. Appl. No. 11/319,758 / Non-Final Office Action Response dated Nov. 3, 2011, 29 pages.
U.S. Appl. No. 11/319,758 / Final Office Action, dated Jan. 17, 2012, 22 pages.
U.S. Appl. No. 11/319,758 / Amendment after final, dated May 17, 2012, 34 pages.
U.S. Appl. No. 11/319,758 / Advisory Action, dated Jun. 20, 2012, 3 pages.
U.S. Appl. No. 11/319,758 / Amendment after final, dated Jun. 28, 2012, 29 pages.
U.S. Appl. No. 11/319,758 / Notice of Allowance and examiner's interview summary, dated Jul. 17, 2012, 10 pages.
U.S. Appl. No. 11/319,758 / Issue Fee Payment, Rule 312 and Miscellaneous Communication, dated Oct. 12, 2012, 12 pages.
U.S. Appl. No. 11/319,758 / Issue Notification, dated Oct. 31, 2012, 1 page.
U.S. Appl. No. 13/632,581, filed Oct. 1, 2012, 88 Pages.
U.S. Appl. No. 13/632,581 / Notice to File Missing Parts and Filing Receipt, dated Oct. 22, 2012, 27 Pages.
U.S. Appl. No. 13/632,581 / Filing Receipt, Mailed 3/4/5, 3 Pages.
U.S. Appl. No. 13/632,581 / Notice of Publication, dated Jun. 13, 2013, 1 Page.
U.S. Appl. No. 13/632,581 / Non-final Office Action, dated Jul. 3, 2013, 22 Pages.
U.S. Appl. No. 13/632,581 / Non-Final Office Action Response, dated Sep. 11, 2013, 23 Pages.
U.S. Appl. No. 13/632,581 / Final Office Action, dated Dec. 18, 2013, 27 Pages.

(56) References Cited

OTHER PUBLICATIONS

U.S. Appl. No. 13/632,581 / Response After Final Action, dated Mar. 18, 2014, 37 Pages.
U.S. Appl. No. 13/632,581 / Advisory Action (PTOL-303), dated Apr. 3, 2014, 4 Pages.
U.S. Appl. No. 13/632,581 / Notice of Appeal Filed Jul. 17, 2014, 2 Pages.
U.S. Appl. No. 13/632,581 / Request for Continued Examination, dated Jul. 16, 2014, 23 Pages.
U.S. Appl. No. 13/632,581 / Notice Non-Compliant Amendment, dated Oct. 20, 2014, 5 pages.
U.S. Appl. No. 13/632,581 / Amendment/Req Reconsideration after Non-Final Reject, Filed Nov. 4, 2014, 16 pages.
U.S. Appl. No. 13/632,581 / Non-Final Rejection, dated Jan. 27, 2015, 16 pages.
U.S. Appl. No. 13/632,581 / Amendment/Req Reconsideration Non-Final Rejection and Amendments, filed Apr. 20, 2015, 24 pages.
U.S. Appl. No. 13/632,581 / Final Rejection, dated Jul. 20, 2015, 21 pages.
U.S. Appl. No. 13/632,581 / After Final Consideration Request and Response, dated Sep. 21, 2015, 28 pages.
U.S. Appl. No. 13/632,581 / Advisory Action and After Final Decision, dated Oct. 2, 2015, 18 pages.
U.S. Appl. No. 13/632,581 / RCE and Amendments, dated Nov. 30, 2015, 55 pages.
U.S. Appl. No. 13/632,581 / Notice of Allowance and Fees, dated Dec. 17, 2015, 5 pages.
U.S. Appl. No. 13/632,581 / Filing Receipt, dated Jan. 22, 2016, 4 pages.
U.S. Appl. No. 13/632,581 / Electronic Terminal Disclaimer, Mar. 7, 2016, 3 pages.
U.S. Appl. No. 13/632,581 / Issue Fee Payment, dated Mar. 16, 2016, 1 page.
U.S. Appl. No. 13/632,581 / Amendment after Notice of Allowance, dated Mar. 16, 2016 19 pages.
U.S. Appl. No. 13/632,581 / Response to Amendment under Rule 312, dated Mar. 22, 2016, 2 pages.
U.S. Appl. No. 13/632,581 / Issue Notification, dated Apr. 13, 2016, 1 page.
U.S. Appl. No. 15/081,612, filed Mar. 25, 2016, 87 Pages.
U.S. Appl. No. 15/081,612 / Notice to File Missing Parts and Filing Receipt, dated Apr. 11, 2016, 4 Pages.
U.S. Appl. No. 15/081,612 / Filing Receipt, dated Apr. 11, 2016, 3 Pages.
U.S. Appl. No. 15/081,612 / Applicant Response to Pre-Exam Formalities Notice and Preliminary Amendments, dated Jun. 13, 2016, 34 pages.
U.S. Appl. No. 15/081,612 / Preliminary Amendment, dated Jun. 14, 2016, 4 pages.
U.S. Appl. No. 15/081,612 / Filing Receipt, dated Jun. 21, 2016, 3 pages.
U.S. Appl. No. 15/081,612 / Non-Final Rejection, dated Jul. 27, 2016, 9 pages.
U.S. Appl. No. 15/081,612 / Electronic Terminal Disclaimer, Sep. 23, 2016, 3 pages.
U.S. Appl. No. 15/081,612 / Notice of Publication, dated Sep. 29, 2016, 1 page.
U.S. Appl. No. 15/081,612 / Amendment/Req. Reconsideration—After Non-Final Reject, dated Oct. 17, 2016, 10 pages.
U.S. Appl. No. 15/081,612 / Notice of Allowance and Fees, dated Oct. 27, 2016, 5 pages.
U.S. Appl. No. 15/081,612 / RCE, Jan. 30, 2017, 2 pages.
U.S. Appl. No. 15/081,612 / Issue Fee Payment, dated Jan. 30, 2017, 1 page.
U.S. Appl. No. 15/081,612 / Notice of Allowance and Fees Due, dated Jan. 30, 2017, 2 pages.
U.S. Appl. No. 15/081,612 / Notice of Allowance and Fees Due, dated Feb. 13, 2017, 7 pages.
U.S. Appl. No. 15/081,612 / Amendment After Notice of Allowance, dated Mar. 20, 2017, 4 pages.
U.S. Appl. No. 15/081,612 / Issue Fee Payment, dated Mar. 20, 2017, 1 page.
U.S. Appl. No. 11/006,842, filed Dec. 7, 2004, 58 pages.
U.S. Appl. No. 11/006,842 / Notice to file missing parts dated Jan. 10, 2005, 2 pages.
U.S. Appl. No. 11/006,842 / Response to Notice to file missing parts dated Apr. 1, 2005, 7 pages.
U.S. Appl. No. 11/006,842 / Preliminary Amendment dated May 2, 2005, 93 pages.
U.S. Appl. No. 11/006,842 / Restriction Requirement dated Jan. 23, 2008, 5 pages.
U.S. Appl. No. 11/006,842 / Response to Restriction Requirement dated Feb. 25, 2008, 25 pages.
U.S. Appl. No. 11/006,842 / Restriction Requirement dated May 13, 2008, 5 pages.
U.S. Appl. No. 11/006,842 / Response to Restriction Requirement dated Aug. 13, 2008, 24 pages.
U.S. Appl. No. 11/006,842 / Non-Final Office Action dated Nov. 3, 2008.
U.S. Appl. No. 11/006,842 / Response to Non-Final Office Action dated May 4, 2009, 35 pages.
U.S. Appl. No. 11/006,842 / Supplemental Response dated Jul. 17, 2009, 23 pages.
U.S. Appl. No. 11/006,842 / Notice of Allowance dated Jul. 27, 2009, 13 pages.
U.S. Appl. No. 11/006,842 / Issue Fee filed Oct. 27, 2009, 1 page.
U.S. Appl. No. 11/006,842 / Issue notification dated Nov. 18, 2009, 1 page.
U.S. Appl. No. 12/613,450 / Continuation application filed Nov. 5, 2009, 63 pages.
U.S. Appl. No. 12/613,450 / Notice of Missing Parts dated Nov. 18, 2009, 2 pages.
U.S. Appl. No. 12/613,450 / Preliminary Amendment and Response to Missing Parts filed Jan. 19, 2010, 16 pages.
U.S. Appl. No. 12/613,450 / Filing receipt dated Jan. 27, 2010, 3 pages.
U.S. Appl. No. 12/613,450 / Notice of Publication dated May 6, 2010, 1 page.
U.S. Appl. No. 12/613,450 / Restriction requirement dated Jun. 10, 2011, 5 pages.
U.S. Appl. No. 12/613,450 / Response to restriction requirement dated Jul. 6, 2011, 17 pages.
U.S. Appl. No. 12/613,450 / Non-Final Office Action, dated Aug. 25, 2011, 15 pages.
U.S. Appl. No. 12/613,450 / Non-Final OA response mailed Dec. 27, 2011, 28 pages.
U.S. Appl. No. 12/613,450 / Final rejection, dated Feb. 14, 2012, 14 pages.
U.S. Appl. No. 12/613,450 / Amendment after final, dated Jun. 8, 2012, 23 pages.
U.S. Appl. No. 12/613,450 / Advisory Action, dated Jun. 20, 2012, 4 pages.
U.S. Appl. No. 12/613,450 / RCE, mailed Jul. 12, 2012, 25 pages.
U.S. Appl. No. 12/613,450 / Notice of Allowance, dated Oct. 7, 2013, 20 pages.
U.S. Appl. No. 12/613,450 / Electronic Terminal Disclaimer filed and approved, Jan. 2, 2014, 2 pages.
U.S. Appl. No. 12/613,450 / Amendment After Final or Under 37CFR 1.312, initialed by the Examiner, dated Jan. 14, 2014, 2 Pages.
U.S. Appl. No. 12/613,450 / Issue Notification, dated Jan. 22, 2014, 1 Page.
U.S. Appl. No. 14/149,749, filed Jan. 7, 2014, 59 Pages.
U.S. Appl. No. 14/149,749 / Notice to File Missing Parts and Filing Receipt, dated Jan. 23, 2014, 6 Pages.
U.S. Appl. No. 14/149,749 / Applicant Response to Pre-exam Formalities Notice, dated May 23, 2014 12 Pages.
U.S. Appl. No. 14/149,749 / Applicant Response to Pre-Exam Formalities Notice, dated Aug. 25, 2014, 103 Pages.
U.S. Appl. No. 14/149,749 / Filing Receipt, dated Sep. 4, 2014, 3 Pages.

(56) References Cited

OTHER PUBLICATIONS

U.S. Appl. No. 14/149,749 / Notice of Publication, dated Dec. 11, 2014, 1 page.
U.S. Appl. No. 14/149,749 / Electronic Terminal Disclaimer Filed and Approved Feb. 23, 2015.
U.S. Appl. No. 14/149,749 / Examiner Initiated Interview Summary, dated Feb. 24, 2015, 2 pages.
U.S. Appl. No. 14/149,749 / Notice of Allowance and Fees and Examiner Search, dated Apr. 17, 2015, 30 pages.
U.S. Appl. No. 14/149,749 / Amendment after Notice of Allowance, filed May 27, 2015, 10 pages.
U.S. Appl. No. 14/149,749 / Issue Fee Payment, filed May 27, 2015, 1 page.
U.S. Appl. No. 14/149,749 / Electronic Terminal Disclaimer Filed and Approved, May 27, 2015, 3 pages.
U.S. Appl. No. 14/149,749 / Response to Amendment under Rule 312, dated May 29, 2015, 1 page.
U.S. Appl. No. 14/149,749 / Response to Amendment under Rule 312, dated Jun. 1, 2015, 3 pages.
U.S. Appl. No. 14/149,749 / Issue Notification, dated Jun. 17, 2015, 1 page.
U.S. Appl. No. 14/149,749, filed May 29, 2015, 39 pages.
U.S. Appl. No. 14/726,192 / Filing Receipt, dated Jun. 9, 2015, 3 pages.
U.S. Appl. No. 14/726,192 / Notice to File Missing Parts, dated Jun. 9, 2015, 2 pages.
U.S. Appl. No. 14/726,192 / Applicant Response to Pre-Exam Formalities Notice and Amendments, filed Aug. 12, 2015, 114 pages.
U.S. Appl. No. 14/726,192 / Filing Receipt, dated Aug. 20, 2015, 3 pages.
U.S. Appl. No. 14/726,192 / Electronic Terminal Disclaimer Filed and Approved, Nov. 20, 2015, 3 pages.
U.S. Appl. No. 14/726,192 / Notice of Publication, dated Nov. 27, 2015, 1 page.
U.S. Appl. No. 14/726,192 / Issue Fee Payment and Amendment after Notice of Allowance, dated Jul. 18, 2016, 13 pages.
U.S. Appl. No. 14/726,192 / Response to Amendment under Rule 312, dated Jul. 21, 2016, 1 page.
U.S. Appl. No. 14/726,192 / Response to Amendment under Rule 312, dated Jul. 22, 2016, 2 pages.
U.S. Appl. No. 14/726,192 / Issue Notification, dated Aug. 3, 2016, 1 page.
U.S. Appl. No. 15/240,964 / Application and Preliminary Amendments as filed Aug. 18, 2016, 70 pages.
U.S. Appl. No. 15/240,964 / Filing Receipt, dated Aug. 31, 2016, 3 pages.
U.S. Appl. No. 15/240,964 / Notice of Publication, dated Dec. 8, 2016.
U.S. Appl. No. 15/240,964 / Non-Final Rejection, dated Mar. 14, 2017, 23 pages.
U.S. Appl. No. 11/320,538, filed Dec. 27, 2005, 76 pages.
U.S. Appl. No. 11/320,538 / Notice of Missing Parts dated Feb. 2, 2006, 2 pages.
U.S. Appl. No. 11/320,538 / Response to Missing Parts filed Aug. 2, 2006, 36 pages.
U.S. Appl. No. 11/320,538 / Non-final Office Action dated Apr. 1, 2009, 27 pages.
U.S. Appl. No. 11/320,538 / Amendment filed Jul. 1, 2009, 54 pages.
U.S. Appl. No. 11/320,538 / Final Office Action dated Nov. 2, 2009, 29 pages.
U.S. Appl. No. 11/320,538 / Response to Final Office Action filed Jan. 4, 2010, 23 pages.
U.S. Appl. No. 11/320,538 / Advisory Action dated Jan. 19, 2010, 3 pages.
U.S. Appl. No. 11/320,538 / RCE and Amendment filed Apr. 2, 2010, 26 pages.
U.S. Appl. No. 11/320,538 / Non-Final Office Action dated Jun. 9, 2010, 24 pages.
U.S. Appl. No. 11/320,538 / Office action dated Dec. 22, 2010, 10 pages.
U.S. Appl. No. 11/320,538 / Notice of Appeal, mailed May 23, 2011, 6 pages.
U.S. Appl. No. 11/320,538 / Pre-brief appeal conference decision mailed Jun. 30, 2011, 2 pages.
U.S. Appl. No. 11/320,538 / Request for Continued Examination dated Dec. 23, 2011, 21 pages.
U.S. Appl. No. 11/320,538 / Non-Final Office Action, dated Dec. 19, 2012, 12 pages.
U.S. Appl. No. 11/320,538 / Response to Non-Final office action, dated Apr. 17, 2013, 20 pages.
U.S. Appl. No. 11/320,538 / Notice of allowance, dated Aug. 1, 2013, 25 pages.
U.S. Appl. No. 11/320,538 / Issue fee payment, dated Nov. 1, 2013, 7 pages.
U.S. Appl. No. 11/320,538 / Rule 312 amendment, dated Nov. 19, 2013, 20 pages.
U.S. Appl. No. 11/320,538 / Issue Notification, dated Dec. 4, 2013, 1 page.
U.S. Appl. No. 14/086,741, filed Dec. 12, 2013, 77 Pages.
U.S. Appl. No. 14/086,741 / Filing Receipt and Notice to File Missing Parts, dated Dec. 12, 2013, 6 Pages.
U.S. Appl. No. 14/086,741 / Applicant Response to Pre-Exam Formalities Notice, dated Jun. 12, 2014, 60 Pages.
U.S. Appl. No. 14/086,741 / Filing Receipt, dated Jun. 17, 2014, 3 Pages.
U.S. Appl. No. 14/086,741 / Notice of Publication, dated Sep. 25, 2014, 1 Page.
U.S. Appl. No. 14/086,741 / Terminal Disclaimer as Filed on Sep. 29, 2014, 1 Page.
U.S. Appl. No. 14/086,741 / Terminal Disclaimer Review Decision, Mailed Sep. 30, 2014, 1 Page.
U.S. Appl. No. 14/086,741 / Notice of Allowance and Fees and Examiner Summary, dated Oct. 3, 2014, 21 pages.
U.S. Appl. No. 14/086,741 / Notice of Allowance and Fees Due, Filed Oct. 3, 2014, 22 pages.
U.S. Appl. No. 14/086,741 / Amendment after Notice of Allowance, filed Jan. 5, 2015, 14 pages.
U.S. Appl. No. 14/086,741 / Issue Fee Payment, filed Jan. 5, 2015, 1 page.
U.S. Appl. No. 14/086,741 / Response to Amendment under Rule 312, dated Jan. 22, 2015, 2 pages.
U.S. Appl. No. 14/086,741 / Notice of Allowance and Fees and Examiner Search strategy, dated Mar. 16, 2015, 40 pages.
U.S. Appl. No. 14/086,741 / Issue Notification, dated Apr. 1, 2015, 1 page.
U.S. Appl. No. 14/596,154, filed Jan. 13, 2015, 60 pages.
U.S. Appl. No. 14/596,154 / Filing Receipt, dated Jan. 27, 2015, 3 pages.
U.S. Appl. No. 14/596,154 / Notice to File Missing Parts, dated Jan. 27, 2015, 3 pages.
U.S. Appl. No. 14/596,154 / Applicant Response to Pre Exam Formalities Notice with Preliminary Amendments, filed Mar. 27, 2015, 85 pages.
U.S. Appl. No. 14/596,154 / Filing Receipt, dated Apr. 2, 2015, 3 pages.
U.S. Appl. No. 14/596,154 / Notice of Publication, dated Jul. 9, 2015, 1 page.
U.S. Appl. No. 14/596,154 / Electronic Terminal Disclaimer Filed and Approved, Nov. 20, 2015, 3 pages.
U.S. Appl. No. 11/361,500, filed Feb. 23, 2006, 72 pages.
U.S. Appl. No. 11/361,500 / Notice to file missing parts dated Mar. 23, 2006, 2 pages.
U.S. Appl. No. 11/361,500 / Response to Notice to File Missing Parts dated Jul. 19, 2006, 27 pages.
U.S. Appl. No. 11/361,500 / Notice of Publication dated Nov. 16, 2006, 1 page.
U.S. Appl. No. 11/361,500 / Office Action dated May 27, 2009, 18 pages.
U.S. Appl. No. 11/361,500 / Response to Office Action dated Aug. 27, 2009, 34 pages.

(56) References Cited

OTHER PUBLICATIONS

U.S. Appl. No. 11/361,500 / Notice of Allowance dated Dec. 11, 2009, 8 pages.
U.S. Appl. No. 11/361,500 / Issue Fee Payment and Rule 312 Amendment dated Jan. 6, 2010, 28 pages.
U.S. Appl. No. 11/361,500 / Response to Rule 312 Amendment dated Jan. 25, 2010, 4 pages.
U.S. Appl. No. 11/361,500 / Issue Notification dated Feb. 24, 2010, 1 page.
U.S. Appl. No. 12/702,243 / Continuation Application with Preliminary Amendment filed Feb. 8, 2010, 83 pages.
U.S. Appl. No. 12/702,243 / Notice of Missing Parts dated Feb. 25, 2010, 2 pages.
U.S. Appl. No. 12/702,243 / Response to Missing Parts filed Apr. 26, 2010, 8 pages.
U.S. Appl. No. 12/702,243 / Filing receipt dated May 4, 2010, 3 pages.
U.S. Appl. No. 12/702,243 / Notice of Publication dated Aug. 12, 2010, 1 page.
U.S. Appl. No. 12/702,243 / Non-Final rejection, dated Aug. 30, 2012, 8 pages.
U.S. Appl. No. 12/702,243 / Amendment, dated Nov. 20, 2012, 14 pages.
U.S. Appl. No. 12/702,243 / Terminal Disclaimer, mailed Jan. 2, 2013, 5 pages.
U.S. Appl. No. 12/702,243 / Terminal Disclaimer decision, mailed Jan. 4, 2013, 1 p. 1.
U.S. Appl. No. 12/702,243 / Notice of allowance and fees due and examiner interview summary, dated Jan. 10, 2013, pages.
U.S. Appl. No. 12/702,243 / Issue notification, dated Apr. 24, 2013, 1 page.
U.S. Appl. No. 13/860,482, filed Apr. 10, 2013, 98 Pages.
U.S. Appl. No. 13/860,482 / Notice to File Missing Parts and Filing Receipt, dated May 21, 2013, 5 Pages.
U.S. Appl. No. 13/860,482 / Applicant Respose to Pre-Exam Formalities Notice, dated Oct. 22, 2013, 3 Pages.
U.S. Appl. No. 13/860,482 / Notice of Publication, dated Feb. 6, 2014, 1 Page.
U.S. Appl. No. 13/860,482 / Non-Final Office Action, dated Jun. 9, 2014, 11 Pages.
U.S. Appl. No. 13/860,482 / Non-Final Office Action Response, dated Sep. 8, 2014, 19 Pages.
U.S. Appl. No. 13/860,482 / Terminal Disclaimer Review Decision, Sep. 9, 2014, 1 page.
U.S. Appl. No. 13/860,482 / Terminal Disclaimer Filed, Oct. 8, 2014, 1 page.
U.S. Appl. No. 13/860,482 / Terminal Disclaimer Review Decision, Oct. 9, 2014, 1 page.
U.S. Appl. No. 13/860,482 / Notice of Allowance and Fees Due, dated Nov. 5, 2014, 8 Pages.
U.S. Appl. No. 13/860,482 / Issue Fee Payment and Rule 312 Amendments, filed Feb. 4, 2015, 4 pages.
U.S. Appl. No. 13/860,482 / Issue Notification, dated Mar. 4, 2015, 1 page.
U.S. Appl. No. 14/614,292, filed Feb. 4, 2015, 76 pages.
U.S. Appl. No. 14/614,292 / Notice to File Missing Parts and Filing Receipt, dated Feb. 20, 2015, 5 pages.
U.S. Appl. No. 14/614,292 / Applicant Response to Pre-Exam Formalities Notice and Amendments, filed Apr. 17, 2015, 30 pages.
U.S. Appl. No. 14/614,292 / Filing Receipt, dated Apr. 24, 2015, 3 pages.
U.S. Appl. No. 14/614,292 / Notice of Publication, dated Aug. 6, 2015, 1 page.
U.S. Appl. No. 14/614,292 / Electronic Terminal Disclaimer Filed and Approved, Nov. 20, 2015, 3 pages.
U.S. Appl. No. 14/614,292 / Non-Final Rejection, dated May 19, 2016, 10 pages.
U.S. Appl. No. 14/614,292 / Amendment/Req. Reconsideration-After Non-Final Rejection, dated Aug. 18, 2016, 20 pages.
U.S. Appl. No. 14/614,292 / Notice of Allowance and Fees, dated Sep. 21, 2016, 8 pages.
U.S. Appl. No. 14/614,292 / Isse Fee Payment and Amendment after Notice of Allowance, dated Dec. 21, 2016, 4 pages.
U.S. Appl. No. 15/411,823, filed, Jan. 20, 2017, 77 pages.
U.S. Appl. No. 15/411,823 / Preliminary Amendment, dated Jan. 20, 2017, 25 pages.
U.S. Appl. No. 15/411,823 / Filing Receipt, dated Jan. 31, 2017, 3 pages.
U.S. Appl. No. 11/412,417, filed Apr. 26, 2006, 96 pages.
U.S. Appl. No. 11/412,417 / Notice of Missing Parts dated May 19, 2006, 2 pages.
U.S. Appl. No. 11/412,417 / Response to Notice of Missing Parts filed Jul. 19, 2006, 14 pages.
U.S. Appl. No. 11/412,417 / Non-final Office Action dated Apr. 1, 2008, 53 pages.
U.S. Appl. No. 11/412,417 / Amendment filed Aug. 1, 2008, 34 pages.
U.S. Appl. No. 11/412,417 / Final Office Action dated Nov. 13, 2008, 40 pages.
U.S. Appl. No. 11/412,417 / RCE and Amendment filed May 12, 2009, 36 pages.
U.S. Appl. No. 11/412,417 / Non-final Office Action dated Jun. 30, 2009, 141 pages.
U.S. Appl. No. 11/412,417 / Examiner Interview Summary dated Oct. 30, 2009, 3 pages.
U.S. Appl. No. 11/412,417 / Amendment filed Oct. 30, 2009, 33 pages.
U.S. Appl. No. 11/412,417 / Final Office Action dated Jan. 4, 2010, 37 pages.
U.S. Appl. No. 11/412,417 / RCE with Amendment filed May 4, 2010, 27 pages.
U.S. Appl. No. 11/412,417 / Supplemental Office Action Response dated Jun. 22, 2010, 22 pages.
U.S. Appl. No. 11/412,417 / Notice of Allowance and bibliographic data sheet dated Jul. 6, 2010, 9 pages.
U.S. Appl. No. 11/412,417 / RCE mailed Oct. 5, 2010, 4 pages.
U.S. Appl. No. 11/412,417 / Notice of Allowance and bibliographic data sheet dated Oct. 26, 2010, 4 pages.
U.S. Appl. No. 11/412,417 / Issue Fee Payment and Comments on Reasons for Allowance dated Jan. 26, 2011, 6 pages.
U.S. Appl. No. 11/412,417 / Issue Notification dated Feb. 9, 2011, 1 page.
U.S. Appl. No. 13/030,084, filed Feb. 17, 2011, 103 pages.
U.S. Appl. No. 13/030,084 / Filing Receipt and Notice to File Missing parts dated Mar. 3, 2011, 6 pages.
U.S. Appl. No. 13/030,084 / Response to Notice to File Missing Parts, dated Aug. 3, 2011, 23 pages.
U.S. Appl. No. 13/030,084 / Updated filing receipt, dated Aug. 11, 2011, 3 pages.
U.S. Appl. No. 13/030,084 / Non-Final Rejection dated Oct. 26, 2011, 34 pages.
U.S. Appl. No. 13/030,084 / Notice of Publication dated Nov. 17, 2011, 1 page.
U.S. Appl. No. 13/030,084 / Amendment, dated Jan. 26, 2012, 35 pages.
U.S. Appl. No. 13/030,084 / Notice regarding non-compliant amendment, dated Jan. 31, 2012, 4 pages.
U.S. Appl. No. 13/030,084 / Amendment, dated Feb. 9, 2012, 35 pages.
U.S. Appl. No. 13/030,084 / Final Rejection, dated Mar. 28, 2012, 62 pages.
U.S. Appl. No. 13/030,084 / Amendment after final, dated Jun. 14, 2012, 88 pages.
U.S. Appl. No. 13/030,084 / Advisory Action, dated Jun. 26, 2012, 4 pages.
U.S. Appl. No. 13/030,084 / RCE, mailed Jul. 23, 2012, 89 pages.
U.S. Appl. No. 13/030,084 / Notice regarding non-compliant amendment, dated Jul. 25, 2012, 2 pages.
U.S. Appl. No. 13/030,084 / Amendment, dated Jan. 2, 2013, 40 pages.
U.S. Appl. No. 13/030,084 / Refund request, dated Jan. 23, 2013 17 pages.

(56) References Cited

OTHER PUBLICATIONS

U.S. Appl. No. 13/030,084 / Non-Final office action, dated Apr. 20, 2013, 39 pages.
U.S. Appl. No. 13/030,084 / Response to non-final office action, dated Jul. 30, 2013, 28 pages.
U.S. Appl. No. 13/030,084 / Non-final office action, dated Oct. 10, 2013, 44 pages.
U.S. Appl. No. 13/030,084 / Response after Non-Final Reject, dated Jan. 2, 2014, 1 Page.
U.S. Appl. No. 13/030,084 / Final Rejection, dated Mar. 19, 2014, 41 Pages.
U.S. Appl. No. 13/030,084 / Amendment Submitted/Entered with Filing of CPA/RCE, dated May 19, 2014, 38 Pages.
U.S. Appl. No. 13/030,084 / Advisory Action (PTOL-303), dated Jun. 6, 2014, 4 Pages.
U.S. Appl. No. 13/030,084 / Applicant Initiated Interview Summary (PTOL-413), dated Jul. 1, 2014, 3 Pages.
U.S. Appl. No. 13/030,084 / Request for Continued Examination, dated Aug. 15, 2014, 26 Pages.
U.S. Appl. No. 13/030,084 / Non-Final Rejection and Examiner's Search, dated Mar. 24, 2015, 24 pages.
U.S. Appl. No. 13/030,084 / Amendment/Req. Reconsideration After Non-Final Rejection, filed Jun. 24, 2015, 28 pages.
U.S. Appl. No. 13/030,084 / Terminal Disclaimer filed and Approved, Sep. 10, 2015, 3 pages.
U.S. Appl. No. 13/030,084 / Notice of Allowance and Fees, dated Sep. 17, 2015, 24 pages.
U.S. Appl. No. 13/030,084 / Issue Fee Payment and Amendment, dated Dec. 10, 2015, 4 pages.
U.S. Appl. No. 14/968,429, filed Dec. 14, 2015.
U.S. Appl. No. 14/968,429 / Filing Receipt, dated Jan. 4, 2016, 3 pages.
U.S. Appl. No. 14/968,429 / Applicant Response to Pre-Exam Formalities Notice, dated Jan. 14, 2016, 35 pages.
U.S. Appl. No. 14/968,429 / Filing Receipt, dated Jan. 21, 2016, 3 pages.
U.S. Appl. No. 14/968,429 / Notice of Publication, dated Apr. 28, 2016, 1 page.
U.S. Appl. No. 11/480,094, filed Jun. 29, 2006, 125 pages.
U.S. Appl. No. 11/480,094 / Notice to File Corrected Application Papers dated Aug. 2, 2006, 2 pages.
U.S. Appl. No. 11/480,094 / Response to Notice to File Corrected Application Papers filed Nov. 2, 2006, 32 pages.
U.S. Appl. No. 11/480,094 / Filing Receipt dated Dec. 7, 2016, 3 pages.
U.S. Appl. No. 11/480,094 / Non-final Office Action dated Nov. 7, 2008, 28 pages.
U.S. Appl. No. 11/480,094 / Amendment filed May 7, 2009, 37 pages.
U.S. Appl. No. 11/480,094 / Final Office Action dated Jul. 28, 2009, 16 pages.
U.S. Appl. No. 11/480,094 / RCE with Amendment filed Dec. 28, 2009, 39 pages.
U.S. Appl. No. 11/480,094 / Office Action dated Dec. 15, 2010, 15 pages.
U.S. Appl. No. 11/480,094 / Office Action response, dated May 16, 2011, 29 pages.
U.S. Appl. No. 11/480,094 / Final Office Action, dated Aug. 1, 2011, 13 pages.
U.S. Appl. No. 11/480,094 / Amendment after final dated Nov. 1, 2011, 32 pages.
U.S. Appl. No. 11/480,094 / Advisory Action dated Nov. 14, 2011, 3 pages.
U.S. Appl. No. 11/480,094 / Notice of Appeal mailed Nov. 28, 2011, 1 page.
U.S. Appl. No. 11/480,094 / Abandonment, mailed Jul. 31, 2012, 2 pages.
Boppana et al., "Full Fault Dictionary Storage Based on Labeled Tree Encoding", Proceedings of $14^{th}$ VLSI Test Symposium, 1996, pp. 174-179.
Caviness et al, "Simplification of Radical Expressions", ACM, pp. 329-338, 1976.
Hirschberg, "Algorithm for Computing Maximal Common Sebsequences", Communicatoin of the ACM, vol. 18, No. 6, pp. 341-343, 1975.
Siegel, "All Searches Are Divided into Three Parts String Searches Using Ternary Trees", ACM, pp. 57-68, 1988.
U.S. Appl. No. 14/870,744 / Amendment/Req. Reconsideration—After Non-Final Reject, dated Nov. 24, 2017, 30 pages.
U.S. Appl. No. 14/870,744 / Final Rejection, dated Mar. 30, 2018, 20 pages.
U.S. Appl. No. 12/573,829 / Non-Final Rejection, dated Dec. 27, 2017, 13 pages.
U.S. Appl. No. 12/573,829 / Amendment/Req. Reconsideration—After Non-Final Reject, dated Mar. 27, 2018, 22 pages.
U.S. Appl. No. 15/214,168 / Amendment after Notice of Allowance, dated Nov. 1, 2017, 22 pages.
U.S. Appl. No. 15/214,168 / Issue Notification, dated Nov. 21, 2017, 1 page.
U.S. Appl. No. 15/802,348 / Application as filed with Preliminary Amendment, dated Nov. 2, 2017, 126 pages.
U.S. Appl. No. 15/802,348 / Filing Receipt, dated Nov. 30, 2017, 4 pages.
U.S. Appl. No. 15/802,348 / Notice to File Corrected Application Papers, dated Nov. 30, 2017, 2 pages.
U.S. Appl. No. 15/802,348 / Applicant Response to Pre-Exam Formalities Notice, dated Jan. 9, 2018, 17 pages.
U.S. Appl. No. 15/802,348 / Filing Receipt, dated Jan. 11, 2018, 4 pages.
U.S. Appl. No. 15/802,348 / Notice of Publication, dated Apr. 19, 2018, 1 page.
U.S. Appl. No. 12/830,236 / Amendment/Req. Reconsideration—After Non-Final Reject, dated Oct. 23, 2017, 18 pages.
U.S. Appl. No. 12/830,236 / Non-Final Rejection, dated Feb. 6, 2018, 28 pages.
U.S. Appl. No. 12/830,236 / Amendment/Req. Reconsideration-After Non-Final Reject, dated May 4, 2018, 26 pages.
U.S. Appl. No. 14/641,735 / Non-Final Rejection, dated Jul. 14, 2017, 14 pages.
U.S. Appl. No. 14/641,735 / Letter Restarting Period for Response, Aug. 24, 2017, 22 pages.
U.S. Appl. No. 14/641,735 / Amendment/Req. Reconsideration—After Non-Final Reject, dated Nov. 24, 2017, 28 pages.
U.S. Appl. No. 14/641,735 / Final Rejection, dated Mar. 15, 2018, 25 pages.
U.S. Appl. No. 14/641,735 / Response After Final Action, dated May 15, 2018, 28 pages.
U.S. Appl. No. 15/240,964 / Final Rejection, dated Aug. 9, 2017, 25 pages.
U.S. Appl. No. 15/240,964 / After Final Consideration Program Request, Oct. 10, 2017, 30 pages.
U.S. Appl. No. 15/240,964 / Advisory Action, dated Oct. 30, 2017, 3 pages.
U.S. Appl. No. 15/240,964 / RCE and Amendments, dated Nov. 9, 2017, 31 pages.
U.S. Appl. No. 14/596,154 / Non-Final Rejection, dated Sep. 21, 2017, 19 pages.
U.S. Appl. No. 14/596,154 / Amendment/Req. Reconsideration—After Non-Final Reject, dated Dec. 21, 2017, 37 pages.
U.S. Appl. No. 14/596,154 / Notice of Allowance and Fees Due, dated May 2, 2018, 8 pages.
U.S. Appl. No. 15/411,823 / Non-Final Rejection, dated Jan. 25, 2018, 10 pages.
U.S. Appl. No. 15/411,823 / Amendment/Req. Reconsideration—After Non-Final Rejection, dated Apr. 24, 2018, 18 pages.
U.S. Appl. No. 15/411,823 / Terminal Disclaimer—Filed and Approved, Apr. 24, 2018, 3 pages.
U.S. Appl. No. 14/968,429 / Amendment/Req. Reconsideration—After Non-Final Reject, dated Aug. 9, 2017, 19 pages.
U.S. Appl. No. 14/968,429 / Final Rejection, dated Oct. 24, 2017, 10 pages.
U.S. Appl. No. 14/968,429 / Response After Final Action, dated Dec. 26, 2017, 28 pages.

(56) References Cited

OTHER PUBLICATIONS

U.S. Appl. No. 14/968,429 / Advisory Action, dated Jan. 11, 2018, 5 pages.
U.S. Appl. No. 14/968,429 / Terminal Disclaimer—Filed and Approved, Feb. 7, 2018, 3 pages.
U.S. Appl. No. 14/968,429 / Response After Final Action, dated Feb. 7, 2018, 13 pages.
U.S. Appl. No. 14/968,429 / Notice of Allowance and Fees Due, dated Feb. 26, 2018, 8 pages.
U.S. Appl. No. 14/968,429 / Notice of Allowance and Fees Due, dated Mar. 19, 2018, 6 pages.
U.S. Appl. No. 14/870,744 / Response After Final Action, dated May 30, 2018, 33 pages.
U.S. Appl. No. 14/870,744 / Advisory Action, dated Jul. 3, 2018, 5 pages.
U.S. Appl. No. 14/870,744 / RCE and Amendments, dated Jul. 27, 2018, 33 pages.
U.S. Appl. No. 14/870,744 / Notice of Allowance and Fees Due, dated Sep. 6, 2018, 11 pages.
U.S. Appl. No. 12/573,829 / Final Rejection, dated Jul. 11, 2018, 15 pages.
U.S. Appl. No. 12/573,829 / After Final Consideration Program Request, Sep. 7, 2018, 23 pages.
U.S. Appl. No. 12/573,829 / Advisory Action, dated Sep. 24, 2018, 4 pages.
U.S. Appl. No. 12/573,829 / RCE and Amendments, dated Oct. 9, 2018, 20 pages.
U.S. Appl. No. 15/802,348 / Preliminary Amendment, dated Oct. 26, 2018, 24 pages.
U.S. Appl. No. 12/830,236 / Final Rejection, dated Sep. 5, 2018, 30 pages.
U.S. Appl. No. 12/830,236 / After Final Consideration Program Request, Nov. 5, 2018, 24 pages.
U.S. Appl. No. 14/641,735 / Advisory Action, dated Jun. 8, 2018, 4 pages.
U.S. Appl. No. 14/641,735 / Internet Communications Authorized, Jun. 23, 2018, 2 pages.
U.S. Appl. No. 14/641,735 / RCE and Amendments, dated Jul. 16, 2018, 34 pages.
U.S. Appl. No. 14/641,735 / Preliminary Amendment, dated Oct. 26, 2018, 10 pages.
U.S. Appl. No. 14/641,735 / Non-Final Rejection, dated Nov. 2, 2018, 28 pages.
U.S. Appl. No. 15/240,964 / Non-Final Rejection, dated Jul. 30, 2018, 32 pages.
U.S. Appl. No. 15/240,964 / Amendment/Req. Reconsideration—After Non-Final Reject, dated Oct. 30, 2018, 43 pages.
U.S. Appl. No. 14/596,154 / Issue Notification, dated Aug. 21, 2018, 1 page.
U.S. Appl. No. 16/048,113, filed Jul. 27, 2018, 81 pages.
U.S. Appl. No. 16/048,113 / Filing Receipt, dated Aug. 24, 2018, 3 pages.
U.S. Appl. No. 16/048,113 / Notice to File Missing Parts, dated Aug. 24, 2018, 2 pages.
U.S. Appl. No. 16/048,113 / Applicant Response to Pre-Exam Formalities Notice and Amendment, dated Oct. 22, 2018, 38 pages.
U.S. Appl. No. 16/048,113 / Filing Receipt, dated Oct. 24, 2018, 3 pages.
U.S. Appl. No. 15/411,823 / Notice of Allowance and Fees Due, dated Jul. 13, 2018, 8 pages.
U.S. Appl. No. 16/164,430, filed Oct. 18, 2018, 79 pages.
U.S. Appl. No. 16/164,430 / Notice to File Missing Parts, dated Nov. 6, 2018, 2 pages.
U.S. Appl. No. 16/164,430 / Filing Receipt, dated Nov. 6, 2018, 4 pages.
U.S. Appl. No. 14/968,429 / Amendment after Notice of Allowance, dated Mat 31, 2018, 12 pages.
U.S. Appl. No. 14/968,429 / Amendment after Notice of Allowance, dated Jun. 13, 2018, 12 pages.
U.S. Appl. No. 14/968,429 / Response to Amendment under Rule 312, dated Jul. 10, 2018, 2 pages.
U.S. Appl. No. 14/968,429 / Response to Amendment under Rule 312, dated Jul. 23, 2018, 2 pages.
U.S. Appl. No. 14/968,429 / Issue Notification, dated Aug. 1, 2018, 1 page.
U.S. Appl. No. 16/048,061, filed Jul. 27, 2018, 101 pages.
U.S. Appl. No. 16/048,061 / Notice to File Missing Parts, dated Aug. 13, 2018, 2 pages.
U.S. Appl. No. 16/048,061 / Filing Receipt, dated Aug. 13, 2018, 4 pages.
U.S. Appl. No. 16/048,061 / Applicant Response to Pre-Exam Formalities Notice, dated Oct. 12, 2018, 13 pages.
U.S. Appl. No. 16/048,061 / Filing Receipt, dated Oct. 16, 2018, 4 pages.
U.S. Appl. No. 16/048,061 / Request for Corrected Filing Receipt, dated Oct. 31, 2018, 6 pages.
U.S. Appl. No. 16/048,061 / Filing Receipt, dated Nov. 5, 2018, 4 pages.
U.S. Appl. No. 16/209,872 Application as Filed, Dec. 4, 2018, 129 pages.
U.S. Appl. No. 16/209,872 Notice to File Missing Parts, dated Dec. 28, 2018, 2 pages.
U.S. Appl. No. 16/209,872, filed Dec. 28, 2018, 3 pages.
U.S. Appl. No. 12/830,236 After Final Consideration Program Decision, dated Nov. 18, 2018, 4 pages.
U.S. Appl. No. 16/164,535 Application as Filed Oct. 18, 2018, 115 pages.
U.S. Appl. No. 16/164,535, filed Nov. 7, 2018, 4 pages.
U.S. Appl. No. 16/164,535 Notice to File Corrected Application Papers, dated Nov. 7, 2018, 2 pages.
U.S. Appl. No. 15/802,348 Non-Final Rejection, dated Feb. 11, 2019, 18 pages.
U.S. Appl. No. 14/641,735 Amendment/Req. Reconsideration-After Non-Final Reject, dated Feb. 4, 2019, 27 pages.
U.S. Appl. No. 15/464,205 Preliminary Amendment, dated Feb. 22, 2019, 11 pages.
U.S. Appl. No. 15/240,964 Notice of Allowance and Fees Due, dated Feb. 21, 2019, 26 pages.
U.S. Appl. No. 16/048,113 Notice of Publication, dated Jan. 31, 2019, 1 page.
U.S. Appl. No. 16/164,430 Applicant Response to Pre-Exam Formalities Notice, dated Jan. 18, 2019, 29 pages.
U.S. Appl. No. 16/164,430, filedJan. 23, 2019, 4 pages.
U.S. Appl. No. 16/048,061 Notice of Publication, dated Jan. 24, 2019, 1 page.
U.S. Appl. No. 16/164,535 Applicant Response to Pre-Exam Formalities Notice, dated Jan. 7, 2019, 23 pages.
U.S. Appl. No. 16/164,535, filed Jan. 11, 2019, 4 pages.

\* cited by examiner (((A(1) * B((((A(D(1)*B(C(1))))*A(A(1))*D(1)))) * A(1)) * C(D(1)))

400  *Fig. 4*

$Q(0) \Rightarrow 2$
$Q(1) \Rightarrow 3$
$Q(2) \Rightarrow 5$
$Q(3) \Rightarrow 7$
$Q(4) \Rightarrow 11$
$Q(5) \Rightarrow 13$
$Q(6) \Rightarrow 17$
$Q(7) \Rightarrow 19$
$Q(8) \Rightarrow 23$
$Q(9) \Rightarrow 29$
$Q(10) \Rightarrow 31$
$Q(11) \Rightarrow 37$
$Q(12) \Rightarrow 41$
．
．
．

Finite Rooted Unordered 2 Valued Edge-Labeled Trees

*Signature* = < 2 , 2 , 1 >
*Alphabet* = {0, 1, A, B, * }

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1.$$

*Core Model Isomorph (based upon the natural number universe)*

$$A(x) = Q(2x - 2), x \text{ not } 0;$$
$$B(x) = Q(2x - 1), x \text{ not } 0;$$

$$(x * y) = (x \text{ multiplied by } y).$$

700    Fig. 7

Finite Rooted Unordered 3 Valued Edge-Labeled Trees

Signature = < 2, 3, 1 >
Alphabet = {0, 1, A, B, C, * }

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1;$$
$$C(0) = 1.$$

*Core Model Isomorph (based upon the natural number universe)*

$$A(x) = Q(3x - 3), x \text{ not } 0;$$
$$B(x) = Q(3x - 2), x \text{ not } 0;$$
$$C(x) = Q(3x - 1), x \text{ not } 0;$$

$$(x * y) = (x \text{ multiplied by } y).$$

800 Fig. 8

Finite Rooted Unordered 4 Valued Edge-Labeled Trees

*Signature* = <2, 4, 1>
*Alphabet* = {0, 1, A, B, C, D, *}

*Expressions*

910 — $(x * y) = (y * x);$
920 — $((x * y) * z) = (x * (y * z));$

930 — $\begin{cases} (0 * x) = 0; \\ (1 * x) = x; \end{cases}$

940 — $\begin{cases} A(0) = 1; \\ B(0) = 1; \\ C(0) = 1; \\ D(0) = 1. \end{cases}$

*Core Model Isomorph (based upon the natural number universe)*

$A(x) = Q(4x - 4),$ x not 0;
$B(x) = Q(4x - 3),$ x not 0;
$C(x) = Q(4x - 2),$ x not 0;
$D(x) = Q(4x - 1),$ x not 0;

$(x * y) = (x$ multiplied by $y).$

900      Fig. 9

Finite Rooted Unordered 5 Valued Edge-Labeled Trees

*Signature* = < 2, 5, 1 >
*Alphabet* = {0, 1, A, B, C, D, E *}

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1;$$
$$C(0) = 1;$$
$$D(0) = 1;$$
$$E(0) = 1.$$

*Core Model Isomorph (based upon the natural number universe)*

$$A(x) = Q(5x - 5), x \text{ not } 0;$$
$$B(x) = Q(5x - 4), x \text{ not } 0;$$
$$C(x) = Q(5x - 3), x \text{ not } 0;$$
$$D(x) = Q(5x - 2), x \text{ not } 0;$$
$$E(x) = Q(5x - 1), x \text{ not } 0;$$

$$(x * y) = (x \text{ multiplied by } y).$$

1000    Fig. 10

Finite Rooted Unordered 6 Valued Edge-Labeled Trees

*Signature* = < 2 , 6 , 1 >
*Alphabet* = {0, 1, A, B, C, D, E, F * }

*Expressions*

$$(x * y) = (y * x);$$
$$((x * y) * z) = (x * (y * z));$$

$$(0 * x) = 0;$$
$$(1 * x) = x;$$

$$A(0) = 1;$$
$$B(0) = 1;$$
$$C(0) = 1;$$
$$D(0) = 1;$$
$$E(0) = 1;$$
$$F(0) = 1.$$

*Core Model Isomorph (based upon the natural number universe)*

$$A(x) = Q(6x - 6), x \text{ not } 0;$$
$$B(x) = Q(6x - 5), x \text{ not } 0;$$
$$C(x) = Q(6x - 4), x \text{ not } 0;$$
$$D(x) = Q(6x - 3), x \text{ not } 0;$$
$$E(x) = Q(6x - 2), x \text{ not } 0;$$
$$F(x) = Q(6x - 1), x \text{ not } 0;$$

$$(x * y) = (x \text{ multiplied by } y).$$

1100    Fig. 11

|    | 2-ary | 3-ary | 4-ary | 5-ary | 6-ary |
|----|-------|-------|-------|-------|-------|
| 0  | ○     | ⊢----------------------------------→ | | | |
| 1  | ●     | ⊢----------------------------------→ | | | |
| 2  | A●    | ⊢----------------------------------→ | | | |
| 3  | B●    | ⊢----------------------------------→ | | | |
| 4  | A/A   | ⊢----------------------------------→ | | | |
| 5  | A/A   | C●    | ⊢--------------------------→ | | |
| 6  | A/B   | ⊢----------------------------------→ | | | |
| 7  | B/A   | A/A   | D●    | ⊢----------------→ | |
| 8  | A-A-A | ⊢----------------------------------→ | | | |
| 9  | B/B   | ⊢----------------------------------→ | | | |
| 10 | A/A/A | A/C   | ⊢--------------------------→ | | |

METHOD AND/OR SYSTEM FOR MANIPULATING TREE EXPRESSIONS

This disclosure claims priority pursuant to 35 USC 119(e) from U.S. provisional patent application Ser. No. 60/623,280, filed on Oct. 29, 2004, by LeTourneau, titled, "METHOD AND/OR SYSTEM FOR MANIPULATING TREE EXPRESSIONS," assigned to the assignee of the presently claimed subject matter.

BACKGROUND

This disclosure is related to manipulating tree expressions In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database, and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 6 is a table providing an embodiment of a function that relates natural numerals to composite numerals;

FIG. 7 is a table providing symbolic expressions for an embodiment of rooted, unordered, 2-valued edge-labeled trees;

FIG. 8 is a table providing symbolic expressions for an embodiment of rooted, unordered, 3-valued edge-labeled trees;

FIG. 9 is a table providing symbolic expressions for an embodiment of rooted, unordered, 4-valued edge-labeled trees;

FIG. 10 is a table providing symbolic expressions for an embodiment of rooted, unordered, 5-valued edge-labeled trees;

FIG. 11 is a table providing symbolic expressions for an embodiment of rooted, unordered, 6-valued edge-labeled trees;

FIGS. 12 and 13 provide an embodiment of a table relating the natural numerals and embodiments of different tree views;

DETAILED DESCRIPTION

Figure 1:
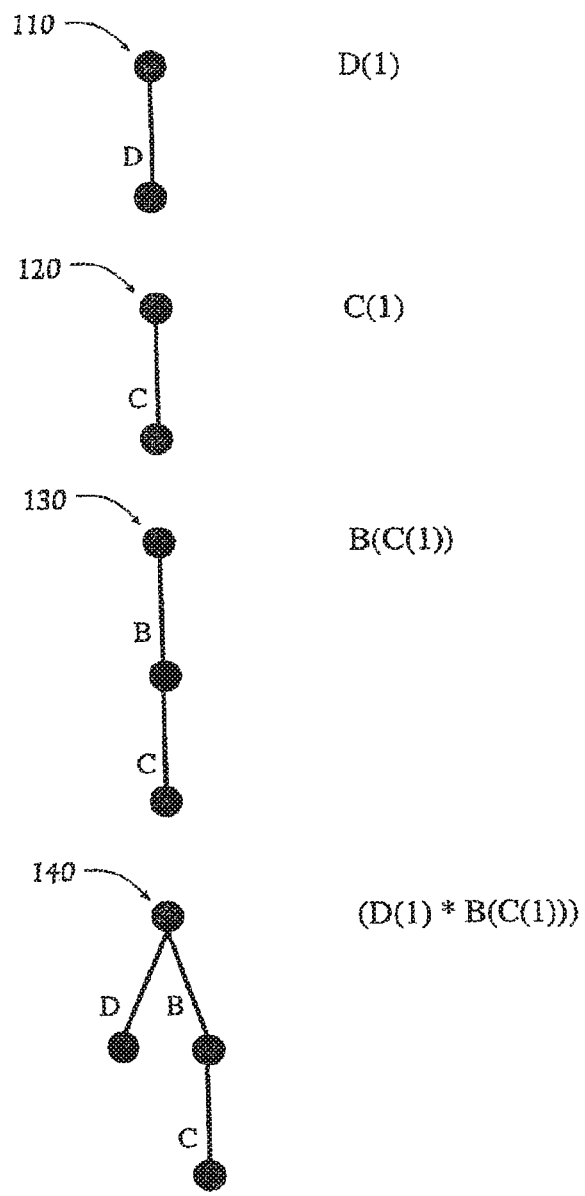
FIG. 1 is a schematic diagram of embodiments of several unordered edge-labeled trees and symbolic expressions mathematically representing the tree embodiments.

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Some portions of the detailed description which follow are presented in terms of algorithms and/or symbolic representations of operations on data bits or binary digital signals stored within a computing system, such as within a computer or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In a variety of fields, data or a set of data, may be represented in a hierarchical fashion. This form of representation may, for example, convey information, such as particular relationships or patterns between particular pieces of data or groups of data and the like. However, manipulating and/or even recognizing specific data representations or patterns is not straight-forward, particularly where the data is arranged in a complex hierarchy. Without loss of generality, examples may include a database and further, without limitation, a relational database. Techniques for performing operations on such databases or recognizing specific patterns, for example, are computationally complex, time consuming, and/or otherwise cumbersome. A need, therefore, continues to exist for improved techniques for performing such operations and/or recognizing such patterns.

As previously discussed, in a variety of fields, it is convenient and/or desirable to represent data, a set of data and/or other information in a hierarchical fashion. In this context, such a hierarchy of data shall be referred to as a "tree." In a particular embodiment, a tree may comprise a finite, rooted, connected, acyclic graph. Likewise, such trees may be either ordered or unordered. Here, ordered refers to the notion that there is an ordering or precedence among nodes attached to a common node corresponding to the order of the attached nodes shown in a graphical illustration. An unordered tree is illustrated here, for example, in FIG. 15 by embodiment 100. As illustrated, the root of this particular embodiment encompasses node 105. In addition to 105, there are eight other nodes designated 110 to 145, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete loop.

Figure 15:
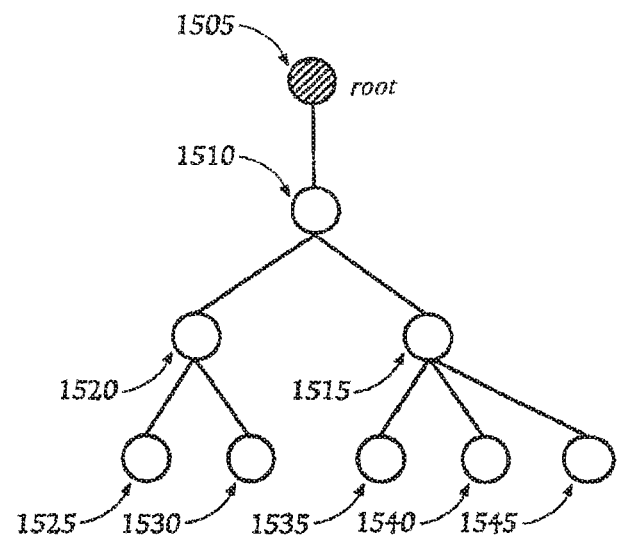
FIG. 15 is a schematic diagram of an unordered edge labeled tree.

As previously suggested, in a variety of contexts, it may be convenient and/or desirable to represent a hierarchy of data and/or other information using a structure, such as the embodiment illustrated in FIG. 15. One particular embodiment, without loss of generality, of a tree may include edges that are labeled with data and/or other values. Likewise, in one particular embodiment, such data and/or values may be limited to a particular set of data. For example, in this context, a binary edge labeled tree refers to a tree in which the data and/or values comprise binary data, that is, in this example, either a binary one or a binary zero. Likewise, alternatively, the edges of a tree may be labeled with three values, such as 0, 1, 2. Continuing, the edges may be labeled with four values, five values, etc. In this context, the class of all trees in which the edges are labeled with a specific number of distinct values, that is, in this context, values chosen from a set having a specific number of distinct elements, shall be referred to as edge-labeled trees (ELTs). It is likewise noted that such trees are not limited to being labeled with the numerals previously described. Any distinctly identifiable labels may be employed; however, in this context, it shall be understood that employing numerals to label the edges is sufficiently general to encompass any sort of data labels that may be desirable, regardless of their form.

To reiterate, in this context, a tree comprises an edge labeled tree if each edge of the string or tree respectively stores a value or single piece of data. Likewise, in this context, two nodes are employed to support an edge holding a single piece of data. At this point, it is worth noting that trees having nodes and edges, such as previously described, may be represented in a computing platform or similar computing device through a data structure or a similar mechanism intended to capture the hierarchical relationship of the data, for example. It is intended that all such embodiments are included within the scope of the claimed subject matter.

It is noted that binary edge labeled trees (BELTs) may be listed or enumerated. See, for example, U.S. provisional patent application Ser. No. 60/543,371, titled "Manipulating Sets of Hierarchical Data," filed on Feb. 8, 2004, by J. J. LeTourneau, and assigned to the assignee of the current provisional application. This is illustrated, here, for example, in FIG. 16. It is noted that this particular figure also includes the associated natural numerals. The association of such numerals for this particular embodiment should be clear based at least in part on previously cited U.S. provisional patent application Ser. No. 60/543,371. However, it is, of course, again noted that the claimed subject matter is not limited in scope to employing the approach or approaches described in aforementioned U.S. provisional patent application Ser. No. 60/543,371. U.S. provisional patent application Ser. No. 60/543,371 is provided simply as an example of listing or enumerating unordered BELTs.

Figure 16:
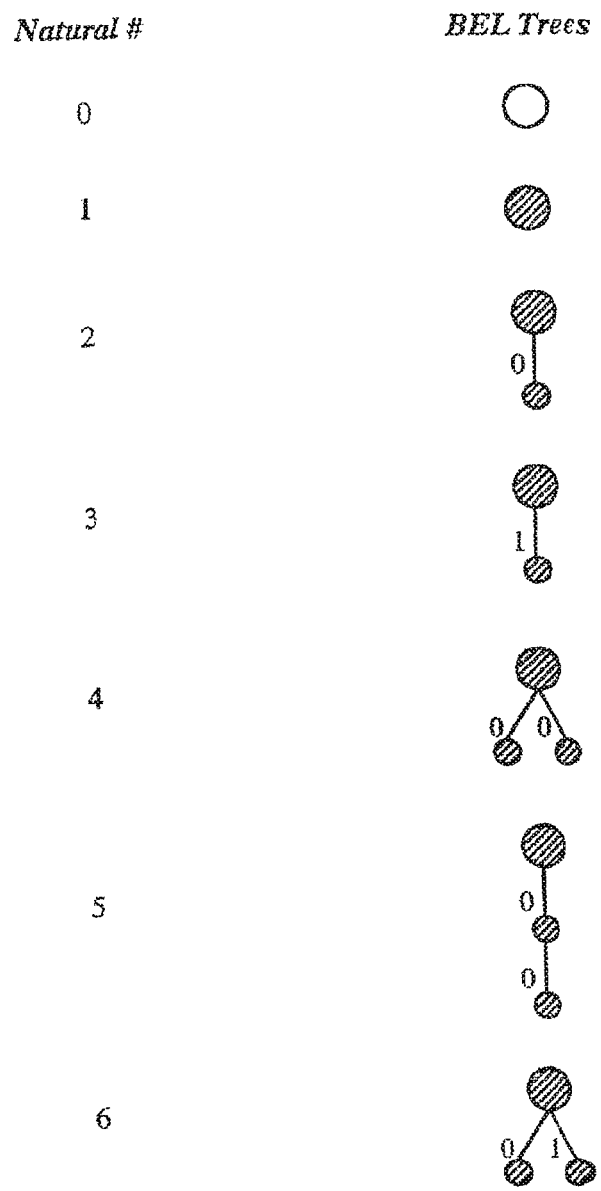
FIG. 16 is a table illustrating an embodiment of a relationship between BELTs and natural numerals.

However, for this particular embodiment, although the claimed subject matter is not limited in scope in this respect, a method of enumerating a set of unordered trees may begin with enumeration of an empty binary edge labeled tree and a one node binary edge labeled tree. Thus, the empty tree is associated with the natural numeral zero and has a symbolic representation as illustrated in FIG. 16 (circle). Likewise, the one node tree, which holds no data, is associated with the natural numeral one and has a graphical representation of a single node. For higher positive natural numbers, ordered trees may be generated by a process described, for example, in "The Lexicographic Generation of Ordered Trees," by S. Zaks, The Journal of Theoretical Computer Science, Vol. 10(1), pp 63-82, 1980, or, "Enumerating Ordered Trees Lexicographically," by M. C. Er, Computation Journal, Vol. 28, Issue 5, pp 538-542, 1985. This may be illustrated, for example in FIG. 16, as described in more detail below.

As illustrated, for this particular embodiment, and as previously described, the empty tree has zero nodes and is associated with the natural numeral zero. Likewise, the one node tree root comprises a single node and is associated with the natural numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the positive natural numeral two. Likewise, to obtain the binary edge labeled tree for position five, begin with the binary edge labeled tree for position two and follow the previously articulated approach of adding a root and an edge and labeling it with a binary zero.

In this context, adding a root node and an edge and labeling it binary zero is referred to as a "zero-push" operation and adding a root node and an edge and labeling it binary one is referred to as a "one-push" operation. Thus, referring again to FIG. 16, the one-push of the root tree is the tree at position three. This follows from FIG. 9 of previously referenced U.S. provisional patent application Ser. No. 60/543,371, since Q((1*2)−1)=Q(1)=3. Likewise, the tree at position five s the zero-push of the tree at position 2. Again, this follows from FIG. 9 of the previously referenced US provisional patent application, since Q((2*2)−2)=Q(2)=5.

In the embodiment just described, binary edge labeled trees use binary numerals "0" and "1." However, the claimed subject matter is not limited in scope to binary edge labeled trees. For example, trees may employ any number of numeral combinations as labels, such as triplets, quadruplets, etc. Thus, using a quadruplet example, it is possible to construct trees, such as a zero-push of a particular tree, a one-push of that tree, a two-push of that tree, and a three-push of that tree. Thus, for such trees, edges may be labeled 0, 1, 2 or 3, etc., as previously described and as explained in more detail hereinafter.

Figure 17:
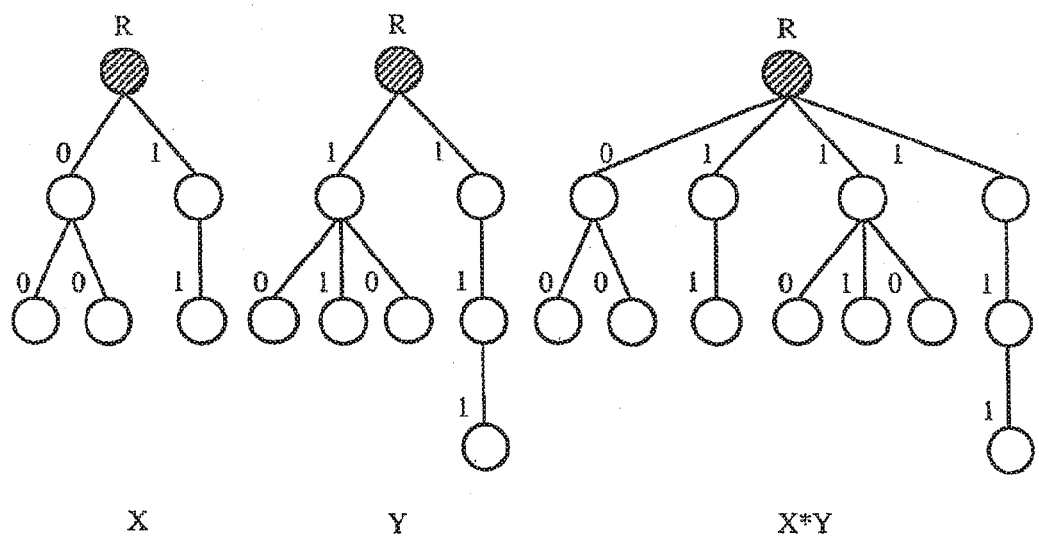
FIG. 17 is a schematic diagram illustrating an embodiment of merging two edge-labeled trees.

The foregoing discussion has begun to characterize an algebra involving trees, in this particular embodiment, an algebra for unordered edge labeled trees or unordered ELTs, such as BELTs. The foregoing discussion defines a value zero, a zero node tree for this particular embodiment, a value one, a one node tree for this particular embodiment, and a monadic operation, previously described as zero-push. For example, alternatively, a "one-push" may be employed. For this embodiment, this is analogous, for example, to the convention that "0" represent "off" and "1" represent "on." Alternatively and equivalently, "1" may be employed to represent "off," and "0" may be employed to represent "on," without loss of generality. For this particular embodiment, an additional operation may be characterized, a "merger" operation. The merger operation with respect to trees refers to merging two trees at their roots. This operation is illustrated, for example, in FIG. 17.

As will now be appreciated, the merger operation comprises a binary operator. Likewise, the constants zero/one, referred to above, may be viewed as an operation having no argument or as a zero valued argument operator or operation. Thus, this operation, in effect, returns the same value whenever applied. Here, for this particular embodiment, the constant value, or zero valued argument operation that returns "c" and is denoted as "c." The merger operator is denoted as "*".

Figure 4:
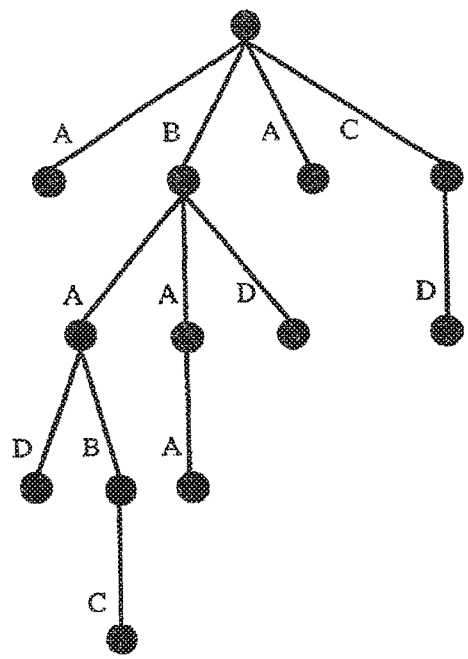
FIG. 4 is a schematic diagram illustrating an embodiment of an unordered edge-labeled tree and a symbolic expression mathematically representing the tree embodiment.

FIG. 4 is schematic diagram illustrating an embodiment of an edge labeled tree, here a 4 valued edge labeled tree. In this particular embodiment, four distinct values are employed to label the edges. Here, the labels comprising A, B, C and D, although, of course, the claimed subject matter is not limited to 4 valued edge labeled trees, to edge labeled trees, or to employing these particular edge labels. It is noted that the labels A, B, C, and D in this embodiment are similar to the labels binary 0 and binary 1 for BELTs. Below tree 400 is a symbolic expression mathematically representing tree 400. Performing the operations indicated by the expression shown in FIG. 4 below tree 400 will provide a natural numeral that corresponds, for this particular embodiment, to this particular tree, as described in more detail hereinafter.

To assist in understanding the relationship between the symbolic expression shown in FIG. 4 and tree 400, for this particular embodiment, FIG. 1 provides an embodiment 110 of another tree. As illustrated, tree 110 comprises an edge label D connecting two nodes. For this particular context, this embodiment may be expressed symbolically as follows: D(1). Thus, a technique to describe the embodiment of tree 110 would refer to the "push" of the natural number 1. Here, for this particular embodiment, this particular push operation comprises the "D" push of 1, resulting in D being the label of the edge connecting the two nodes. More specifically, as previously described, a single node comprises the natural numeral 1 in this particular embodiment. To perform a push operation, an edge is attached to that node and labeled. Here, applying a D push, the label provided comprises the label D.

Figure 2:
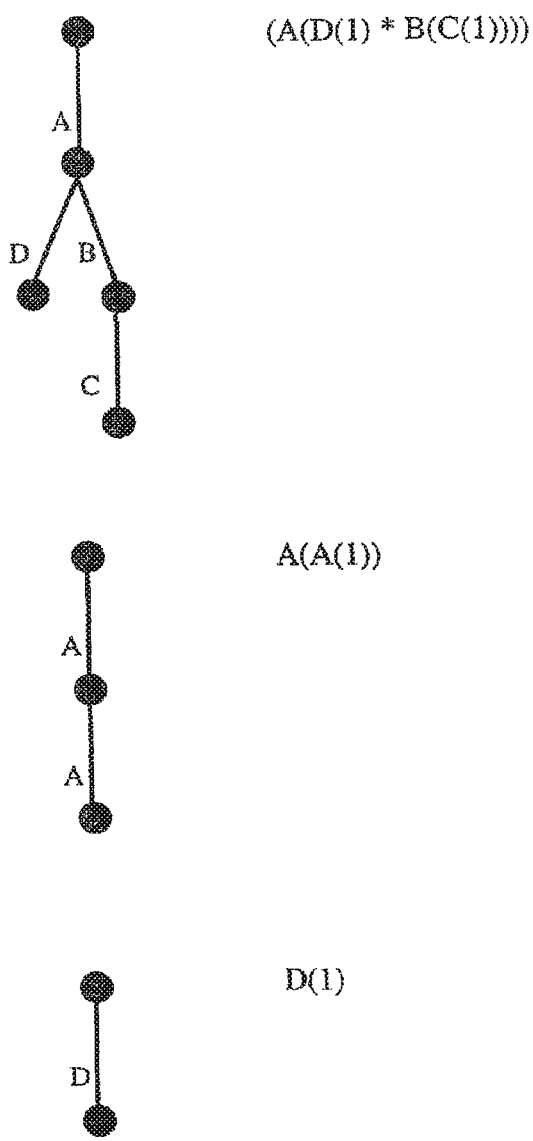
FIG. 2 is a schematic diagram of embodiments of several unordered edge-labeled trees and symbolic expressions mathematically representing the tree embodiments.
Figure 3:
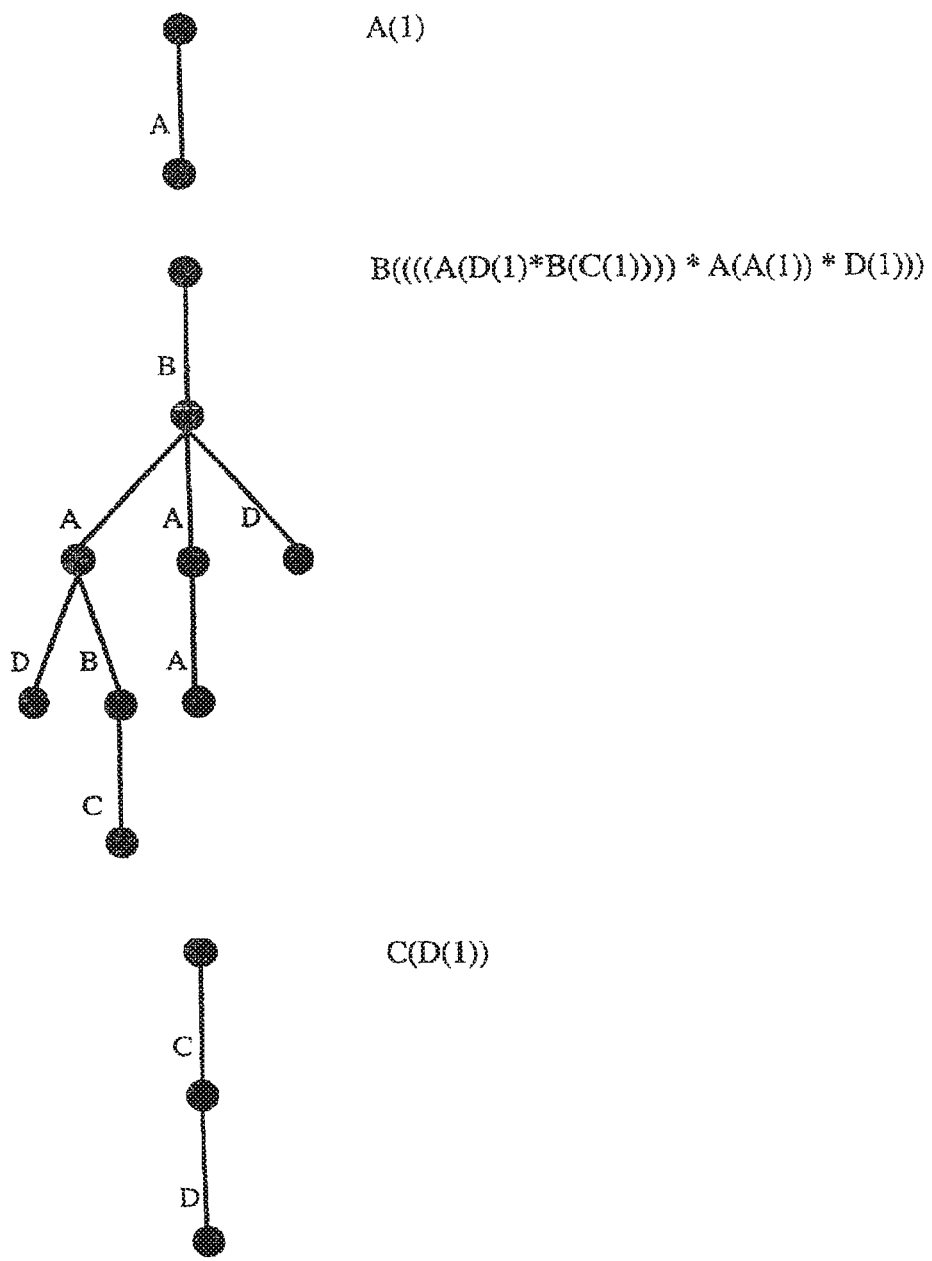
FIG. 3 is a schematic diagram of embodiments of several unordered edge-labeled trees and symbolic expressions mathematically representing the tree embodiments.

Continuing, the "C" push of "1" is illustrated as two nodes with an edge labeled C connecting the two nodes for tree embodiment 120. Applying similar reasoning provides an edge labeled tree embodiment 130 representing the following expression: B(C(1)). Likewise, for this particular embodiment, the operation of merger may be represented as "*", as previously suggested. Thus, applying a merger operation provides tree embodiment 140 at the bottom of FIG. 1 corresponding, for this particular embodiment, to the following expression: (D(1)*B(C(1))). Applying similar reasoning to FIGS. 2 and 3 and the tree embodiments shown ultimately produces tree 400 illustrated in FIG. 4, along with the corresponding symbolic expression.

As the previous discussion suggests, here A, B, C and D comprise monadic operators and the merger operation comprises a binary operation. In U.S. provisional patent application No. 60/575,784, titled "Method and/or System for Simplifying Tree Expressions, such as for Pattern Matching," filed May 28, 2004, by J. J. LeToumeau, assigned to the assignee of the current application, monadic operators similar to those described here were designed as successor operators, using the symbol S(x). Here, these monadic operators comprise multiple successive operators.

Figure 5:
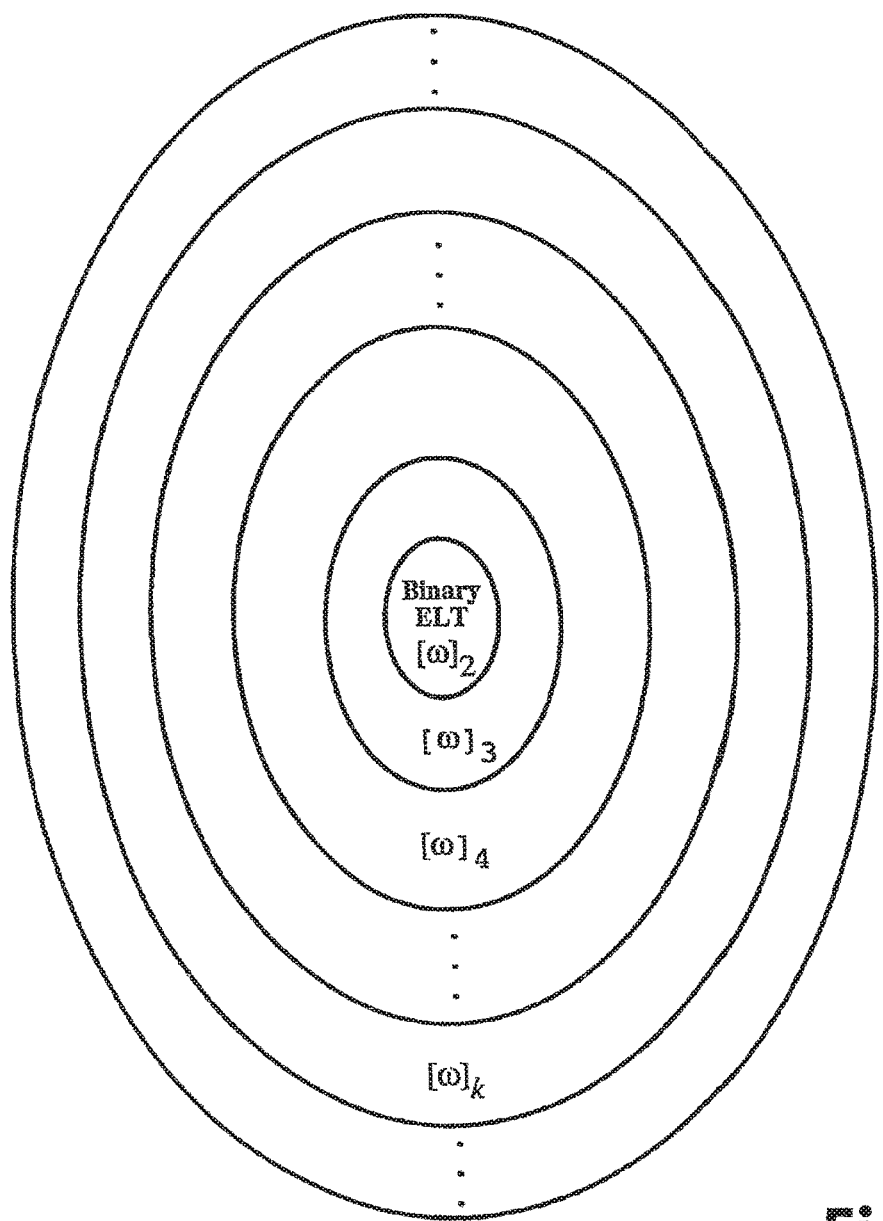
FIG. 5 is a schematic diagram illustrating all N-valued rooted, unordered, edge-labeled trees, where N is a natural numeral greater than or equal to 2.

Previously, an embodiment for manipulating binary edge labeled trees or BELTs was described in connection with U.S. provisional patent application 60/543,371. In that context, binary edge labeled trees comprise finite rooted, unordered two valued edge labeled trees. Thus, for the particular embodiment of binary edge labeled trees described, the two values comprise "0" and "1," although alternately they could comprise A and B, for example, or any other two values. Referring now to FIG. 5, a Venn diagram 500 is illustrated providing the set of all edge labeled trees, structured or organized in a particular manner here. In the center of the diagram, binary or two valued edge labeled trees are depicted as a subset. Furthermore, as illustrated, two valued edge labeled trees are also depicted as a subclass or subset of three valued edge labeled trees. Likewise, three valued edge labeled trees are depicted as a subclass or subset of four valued edge labeled trees and so forth. Thus, depending at least in part on the particular set of distinct values employed to label the edges, an edge labeled tree that employs two distinct values may comprise an example of a three valued edge labeled tree in which one of the values is specifically not employed in the particular tree. As shall be explained in more detail hereinafter, this raises a question regarding proper interpretation of the data that the tree may represent or store. More specifically, an identical tree may represent different data depending at least in part on whether the tree is "viewed" as, to continue with this example, a two valued edge labeled tree or a three valued edge labeled tree. Thus, in this embodiment, we refer to this as the "view" of the particular tree. For example, a two valued edge labeled tree is referred to as view 2 and a three valued edge labeled tree is referred to as view 3, although, for example, the particular tree may not contain three different values. The view in this embodiment refers to the set of distinct values from which the labels may be selected, as previously described. FIG. 5 therefore depicts the set of all edge labeled trees as the union of all such edge labeled trees in which the edge values are selected from a set having a specific number of distinct values.

Previously in U.S. provisional application 60/543,371, an embodiment was demonstrated in which an association existed between natural numerals and binary edge labeled trees. For this particular embodiment, similar associations also exist, here between any N valued edge labeled tree and the natural numerals, where N is a numeral. Of course, many different associations are possible and the claimed subject matter is intended to cover all such associations regardless of the particular embodiment. Thus, for example, three valued edge label trees may be converted to numerals, four valued edge labeled trees may be converted to numerals and so forth. Thus, manipulations, such as those previously described, for example, in aforementioned provisional U.S. patent application 60/543,371, as well as additional manipulations, may be applied to N valued edge labeled trees, as described in more detail hereinafter.

As suggested in previously referenced U.S. provisional application 60/543,371, in one particular embodiment, when converting between binary edge labeled trees and numerals, a relationship was found to exist between a "push" operation and non-composite numerals. Thus, in this context, it may be convenient to define an operation indexed by the natural numerals that provides in ascending order the non-composite numerals, although, of course, the claimed subject matter is not limited in scope in this respect. Such an operation is depicted specifically in FIG. 6. As described in more detail hereinafter, this operation is also convenient in this context in connection with edge labeled trees of any number of distinct edge values.

As previously suggested in aforementioned US provisional patent application No. 60/575,784, a set of congruence operations on the set of tree expressions may be isomorphic to the set of finite, rooted, unordered binary edge labeled trees. Thus, or more particularly, under such an isomorphism, in the particular embodiment, a one-to-one relationship between the equivalence classes that satisfy the tree expressions and the finite, rooted, ordered binary edge labeled trees may exist.

Thus, beginning with binary edge labeled trees or finite rooted unordered two valued edge labeled trees, but continuing to edge labeled trees of higher numbers of values, such as, for example, three valued edge labeled trees, four valued edge labeled trees and so forth, for this embodiment, a similar association or relationship between tree expressions and edge labeled trees may be constructed. Thus, for this embodiment, with a set of operations that satisfies a set of tree expressions an isomorphism with a set of finite routed unordered N valued edge labeled trees results in a similar one to one relationship between the equivalence classes that satisfy the tree expressions and the edge labeled trees themselves. Likewise, by demonstrating that these tree expressions are also isomorphic with natural numerals, tree manipulations are able to be constructed for edge labeled trees using natural numerals, as had similarly been done for binary edge labeled trees. Thus, as shall become more clear hereinafter, manipulating tree expressions is isomorphic to manipulating numerals for this particular embodiment.

Previously, binary edge labeled trees have been discussed. For purposes of illustration, it shall instructive to now discuss another type of edge labeled tree, such as four valued edge labeled trees. For example, FIG. 9 corresponds to finite rooted unordered four valued edge labeled trees, which were also discussed previously with respect to FIG. 4. Thus, for this example embodiment, an algebra may be constructed that is isomorphic to the natural numerals for such four valued edge labeled trees. Likewise, similar algebras may be constructed by use a similar set of tree expressions, as shown, for example, by FIGS. 7, 8, 10 and 11. The similarity of these expressions allows us to write a schema or generalized description and thereby cover all such similar algebras.

Thus, similar to an approach previously described, FIG. 9 provides a set of constants and operators here, constants 0 and 1, monadic operators A, B, C, and D and binary operator *. Thus, we designate this algebra with the signature <2, 4, 1> as a result. The expressions for this particular embodiment are provided in FIG. 9. The first expression, 910, denotes communitivity and the second expression, 920, denotes associativity. Likewise, the next two expressions, 930, define the relationship of the merger of the constants with any other value. The next four expressions, 940, define the monadic operators A, B, C and D.

Thus, for this embodiment, these expressions therefore define a set of edge labeled trees with particular properties. Specifically, the properties are isomorphic to the natural numerals. Thus, as shall be demonstrated further, for this embodiment, four valued edge labeled trees, for example, may be manipulated using natural numerals.

Figure 13:

At least in part because natural numerals are isomorphic to N valued trees, a way to depict this relationship for this embodiment is illustrated by FIGS. 12 and 13. Previously, a particular view for a particular edge labeled tree, for this embodiment, was discussed. In these figures, each column represents a different potential view for a set of edge labeled trees for this embodiment. Likewise, each row provides the edge labeled tree in the view corresponding to the column for the natural number on the left-hand side of FIG. 12.

For example, column one shows the trees with for two valued edge labeled trees edges, otherwise referred to as binary edge labeled trees. Thus, as previously described, no nodes corresponds to "0". Continuing, a single node corresponds to "1" or to "root". Likewise, the numerals two and three in this view turn out to be push operations. In this case, the numeral 2 is the tree corresponding to the A push of one denoted A(1). Likewise, the numeral 3 is the tree corresponding to the B push of one, denoted B(1).

For this embodiment, these relationships may also be confirmed by referring back to FIG. 7. Here, the operations A(x) and B(x) as defined in terms of the function, previously defined in connection with FIG. 6. Thus, using these expressions, to determine the push of 1 denoted A(1), as provided in FIG. 7, this is Q((2*1)−2). This provides Q(0) or the value 2, as demonstrated from FIG. 6. As similar result may be obtained for B(1). Referring to FIG. 7, this corresponds to Q((2*1)−1), or Q(1), again from FIG. 6, the value 3.

A similar relationship may be established for three valued edge labeled trees, described by the expressions provided in FIG. 8, for example. Referring again to FIGS. 12 and 13, the edge labeled trees corresponding to these expressions are depicted in the second column. It is noted that the tree structures using this notation are the same between the first column and the second column for the numerals from zero to four. However, a difference is noted between the first column and the second column at numeral 5. Thus, for view 3, the numeral 5 is the C push of 1. More particularly, again referring to FIG. 8, C(1) equals Q(3*1)−1), or Q(2). From FIG. 6, the corresponding value is 5, as previously suggested. Similarly, looking at column 3 of FIG. 12, for view 5, the D push of 1 is numeral 7.

Thus, for this embodiment, regardless of the "view" of the edge labeled trees, there is a unique one to one correspondence, here, an association embodiment, between the natural numerals and that set of edge labeled trees. This embodiment, therefore, provides the capability to manipulate and combine edge labeled trees of different view. For example, for two edge labeled trees from two different views, one of the edge labeled trees may be converted so that the two edge labeled trees are in the same view. Once in the same view, the trees may be manipulated, such as by a merger, for example. Likewise, in an alternative embodiment, both trees may be converted to numerals, the numerals may be manipulated and then the manipulated numerals may be converted back to edge labeled trees of a particular view. Likewise, the edge labeled trees may be converted to any desirable view.

It is likewise noted that for this particular embodiment one way of manipulation an edge labeled tree is to apply a push operation to the edge labeled tree. Likewise, as previously described, for this embodiment, a push operation comprises adding an edge and labeling it. Assuming for this embodiment that the labels for the edge labeled tree comprise numerals, the label for a particular view will be a numeral that is less than the view itself. For example if the view is 5 than the set of distinct values to label an edge comprises 0, 1, 2, 3 or 4. Of course, this is merely one potential embodiment and the claimed subject matter is not limited in scope in this respect. For example, as previously described, letters may be employed. Likewise, any set of values where each value is distinct may be employed and remain within the scope of the claimed subject matter.

A similar set of manipulations may be applied to node labeled trees rather than edge labeled trees. Thus, node labeled trees may be represented in different views, may be converted to the same view, may be converted to numerals, combined, and converted back to a node labeled tree of a particular view. Likewise, a push operation may be applied to a node labeled tree, as previously described for edge labeled trees.

Although the claimed subject matter is not limited in scope in this respect, one technique for implementing this approach may be to apply a table look up approach. For example, a table providing different embodiments associating different views to natural numerals may be employed. Of course, the claimed subject matter is not limited in scope in this respect. For example, instead, a table look-up may be employed for the operation Q and the expressions previously described may be applied to perform manipulations, such as those previously illustrated, for example.

Techniques for performing table look-ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store a table as just described, although, the claimed subject matter is not necessarily limited in scope to this particular approach. Thus, for example, a hierarchy of data, such as a tree as previously described, for example, may be formed. Likewise, operations and/or manipulations, as described, may be performed; however, operations and/or manipulations in addition to those described or instead of those described may also be applied. It is intended that the claimed subject matter cover such embodiments.

As described in prior embodiments, one technique for manipulating edge labeled trees includes converting such trees to natural numerals, performing manipulation of the natural numerals, and converting back to an edge labeled tree of a particular view. Furthermore, as described above, one technique for such conversions may include table look-up, as described above. Likewise, in another embodiment, it may be possible to convert a natural numeral directly to an edge labeled tree using a table look-up for the operation Q, previously described. For example, if it were desirable to convert the natural numeral 61 to an edge labeled tree in view 4, the numeral could be factored and the factors converted to trees. In this example, 61 is a non-composite, so, using a table look-up, Q(17) provides 61. Thus, 61 is a push of 17. Using the expressions provided on FIG. 9, for example, we may determine whether 61 is the A, B, C, or D push of 17 and so forth. Likewise, for this particular embodiment, previously an example of converting between an edge labeled tree of a particular view and a natural numeral was provided.

Embodiments of a method of manipulating tree expressions have a variety of potentially useful applications. As described previously, trees provide a technique for structuring and/or depicting hierarchical data. Thus, for example, trees may be employed to represent language sentence structures, computer programs, algebraic formulae, molecular structures, family relationships and more. For example, one potential application of such a tree reduction technique is in the area of pattern matching See, for example, "A VLSI Architecture for Object Recognition using Tree Matching" K. Sitaraman, N. Ranganathan and A. Ejnioui; Proceedings of the IEEE International Conference on Application-Specific Systems, Architectures, and Processors (ASAP'02) 2000; "Expressive and efficient pattern languages for tree-structured data" by Frank Neven and Thomas Schwentick; Proceedings of the Nineteenth ACM SIGACT-SIGMOD-SIGART Symposium on Principles of Database Systems, May 2000. Thus, in pattern matching, substructures, in the form of a tree, for example, may be located within a larger structure, also in the form of a tree, referred to in this context as the target. This may be accomplished by comparing the structures; however, typically, such a comparison is complex, cumbersome, and/or time consuming.

Figure 14:
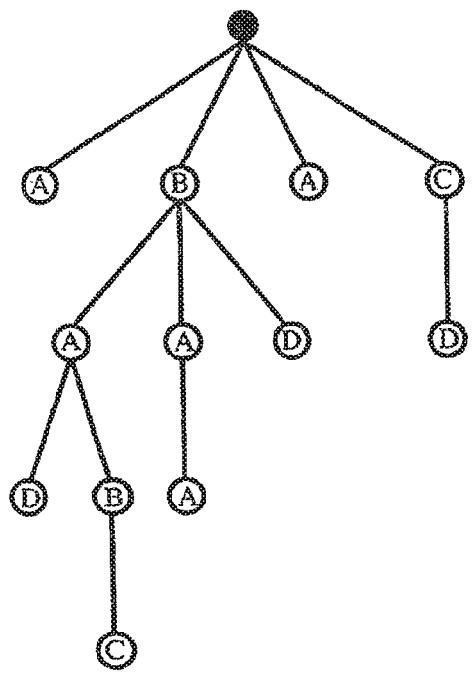
FIG. 14 is a schematic diagram of an unordered node labeled tree.

Of course, the claimed subject matter is not limited to unordered edge labeled trees. For example, as described in previously cited US provisional patent application 60/543, 371, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. Thus, rather than employing edge labeled trees (ELTs), the previously described embodiments may alternatively be performed using node labeled trees (NLTs). One example of a NLT is illustrated in the diagram of FIG. 14 by tree 1400. As one example embodiment, operations and/or manipulations may be employed using edge labeled trees and the resulting edge labeled tree may be converted to a node labeled tree. However, in another embodiment, operations and/or manipulations may be performed directly using node labeled trees.

In accordance with the claimed subject matter, therefore, any tree, regardless of whether it is edge labeled, node labeled, non-binary, a feature tree, or otherwise, may be manipulated and/or operated upon in a manner similar to the approach of the previously described embodiments. Typically, different views shall be employed, depending at least in part, for example, upon the particular type of tree.

Furthermore or alternatively, as described in the previously referenced U.S. provisional patent application 60/543,371, a node labeled tree in which the nodes are labeled with natural numerals or data values may be converted to an edge labeled tree. Furthermore, this may be accomplished with approximately the same amount of storage. For example, for this particular embodiment, this may involve substantially the same amount of node and/or edge data label values. However, for convenience, without intending to limit the scope of the claimed subject matter in any way, here, operations and/or manipulations and the like have been described primarily in the context of ELTs.

In another embodiment, however, a particular tree may include null types or, more particularly, some node values denoted by the empty set. An advantage of employing null types includes the ability to address a broader array of hierarchical data sets. For example, without loss of generality and not intending to limit the scope of the claimed subject matter in any way, a null type permits representing in a database or a relational database, as two examples, situations where a particular attribute does not exist. As may be appreciated, this is different from a situation, for example, where a particular attribute may take on a numeral value of zero. Again, as described in the previously referenced U.S. provisional patent application 60/543,371, a tree with nulls, as described above, may be converted to a tree without nulls; however, the claimed subject matter is not limited in scope in this respect, of course. Thus, it may be desirable to be able to address both situations when representing, operating upon, manipulating and/or searching for patterns regarding hierarchical sets of data.

Likewise, in an alternative embodiment, a node labeled tree, for example, may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied.

Furthermore, a tree in which both the nodes and the edges are labeled may be referred to in this context as a feature tree and may be converted to an edge labeled tree and/or a node labeled tree. For example, without intending to limit the scope of the claimed subject matter, in one approach, a feature tree may be converted by converting any labeled node with its labeled outgoing edge to an ordered pair of labels for the particular node.

In yet another embodiment, for trees in which data labels do not comprise simply natural numerals, such as, as one example, trees that Include negative numerals, such data labels may be converted to an ordered pair of numerals. For example, the first numeral may represent a data type. Examples include a data type such as negative, dollars, etc. As described above, such trees may also be converted to edge labeled trees, for example. However, again, this is provided for purposes of explanation and illustration. The claimed subject matter is not limited in scope to employing the approach of the previously referenced provisional patent application.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method of processing a labeled complex two-dimensional graphical hierarchy, the labeled complex two-dimensional graphical hierarchy being a labeled tree hierarchy, the method comprising:
   accessing instructions from one or more physical memory devices for execution by one or more processors;
   executing the instructions accessed from the one or more physical memory devices on the one or more processors;
   storing, in at least one of the physical memory devices, a database, or a portion thereof containing the labeled complex two-dimensional graphical hierarchy in the form of signal values, and signal values resulting from having executed the instructions on the one or more processors,
   wherein the accessed instructions to convert labeled tree hierarchies; and
   wherein executing the accessed tree hierarchy conversion instructions further comprising:
   converting a first labeled hierarchy in a first view to a first labeled tree hierarchy in a second view represented by signal values,
   wherein different views comprise different sets of distinct values from which labels for the labeled tree hierarchy are selected;
   converting the first labeled tree hierarchy in the second view to an associated first numeral and a second labeled tree hierarchy in the second view to an associated second numeral represented by one or more signal values;

combining the first numeral with the second numeral to create a combined numeral; and converting the combined numeral represented by one or more signal values to an associated labeled tree hierarchy represented by one or more signal values.

2. The method of claim 1, wherein executing the tree hierarchy conversion instructions to convert the labeled tree hierarchies to natural numerals further comprises employing expressions in which a merger operation has the form: X merged with Y=X*Y, wherein X and Y are labeled tree hierarchies.

3. The method of claim 1, wherein the labeled tree hierarchies comprise labeled tree hierarchies in the second view having an associated numeral.

4. The method of claim 1, wherein the labeled tree hierarchies comprise labeled tree hierarchies in a view other than the second view having an associated numeral.

5. The method of claim 1, wherein the executing the tree hierarchy conversion instructions further comprises:

employing a push operation with respect to the first labeled tree hierarchy in the second view, the push operation comprising attaching a n edge to a node of the first labeled tree hierarchy and labeling the edge.

6. The method of claim 1, wherein the labeled tree hierarchies comprise an edge-labeled tree (ELT) hierarchy having an associated numeral.

7. The method of claim 1, wherein the labeled tree hierarchies comprise a node-labeled tree (NLT) hierarchy having an associated numeral.

8. The method of claim 1, wherein the executing the tree hierarchy conversion instructions further comprises:

employing a push operation with respect to the first labeled tree hierarchy in the second view, the push operation comprising attaching a node to an edge of the first labeled tree hierarchy and labeling the node.

9. An article comprising:

a non-transitory storage medium comprising instructions stored thereon, wherein the instructions being accessible from the non-transitory storage medium to store as physical memory states on one or more physical memory devices, the one or more physical memory devices coupled to one or more processors able to execute the instructions stored as physical memory states, the one or more physical memory devices, a database, or a portion thereof to contain the labeled complex two-dimensional graphical hierarchy in the form of signal values, and also able to store binary digital signal quantities, if any, as physical memory states, that are to result from execution of the instructions on the one or more processors, wherein the executable instructions to convert labeled tree hierarchies; and wherein the labeled tree hierarchies conversion instructions further to:

convert a first labeled hierarchy in a first view to be represented by signal values to a first labeled tree hierarchy in a second view to be represented by signal values, wherein different views to comprise different sets of distinct values from which labels for the labeled tree hierarchy are to be selected;

convert the first labeled tree hierarchy in the second view to an associated first numeral and a second labeled tree hierarchy in the second view to an associated second numeral represented by one or more signal values;

combine the first numeral with the second numeral to create a combined numeral; and convert the combined numeral represented by one or more signal values to an associated labeled tree hierarchy represented by one or more signal values.

10. The article of claim 9, the instructions being further executable by the one or more processors to:

convert the labeled tree hierarchy to the numerals to comprise employing expressions in which a merger operation to have the form: X merged with Y=X*Y, wherein X and Y to comprise labeled tree hierarchies.

11. The article of claim 9, the labeled tree hierarchies to comprise labeled tree hierarchies in the second view having an associated numeral.

12. The article of claim 9, the labeled tree hierarchies to comprise labeled tree hierarchies in a view other than the second view having an associated numeral.

13. The article of claim 9, wherein the instructions being further executable by the one or more processors to:

employ a push operation with respect to the first labeled tree hierarchy in the second view, the push operation to comprise attaching an edge to a node of the first labeled tree hierarchy and labeling the edge.

14. The article of claim 9, the labeled tree hierarchies to comprise edge-labeled tree hierarchies having an associated numeral.

15. The article of claim 9, the labeled tree hierarchies to comprise node-labeled tree hierarchies having an associated numeral.

16. The article of claim 9, wherein the instructions being further executable by the one or more processors to:

employ a push operation with respect to the first labeled tree hierarchy in the second view, the push operation to comprise attaching a node to an edge of the first labeled tree hierarchy and labeling the node.

17. An apparatus to manipulate a labeled complex two-dimensional graphical hierarchy, the labeled complex two-dimensional graphical hierarchy being a labeled tree hierarchy, the apparatus comprising:

one or more processors coupled to one or more physical memory devices to store executable instructions and to store binary digital signal quantities as physical memory states, wherein the executable instructions being:

accessible from the physical memory devices for execution by one or more processors; and the one or more processors able to store in at least one of the physical memory devices, a database, or a portion thereof to contain the labeled two-dimensional graphical hierarchy in the form of signal values, binary digital signal quantities, if any, that are to result from execution of the instructions on the one or more processors, wherein the accessed executable instructions to convert labeled tree hierarchies; and wherein the accessed labeled tree hierarchy conversion instructions further:

to convert a first labeled hierarchy in a first view to be represented by signal values to a first labeled tree hierarchy in a second view to be represented by signal values, wherein different views to comprise different sets of distinct values from which labels for the labeled tree hierarchy are to be selected;

to convert the first labeled tree hierarchy in the second view to an associated first numeral and a second labeled tree hierarchy in the second view to an associated second numeral represented by one or more signal values;
to combine the first numeral with the second numeral to create a combined numeral; and
to convert the combined numeral represented by one or more signal values to an associated labeled tree hierarchy represented by one or more signal values.

18. The apparatus of claim 17,
wherein the accessed labeled tree hierarchy instructions further to convert the labeled tree hierarchies to numerals to be represented by one or more signal values by employing expressions in which a merger operation to have the form: X merged with Y=X*Y, wherein X and Y to comprise labeled tree hierarchies.

19. The apparatus of claim 17, wherein the accessed labeled tree hierarchy instructions further to convert the labeled tree hierarchies to labeled tree hierarchies in the second view having an associated numeral.

20. The apparatus of claim 17, wherein the accessed labeled tree hierarchy instructions further to convert the labeled tree hierarchies to labeled tree hierarchies in a view other than the second view having an associated numeral.

21. The apparatus of claim 17,
wherein the accessed labeled tree hierarchy instructions further to employ a push operation with respect to the first labeled tree hierarchy in the second view before converting the first labeled tree to the first numeral, the push operation to comprise to attach an edge to a node of the first labeled tree hierarchy and label the edge.

22. The apparatus of claim 17, the labeled tree hierarchies to comprise edge-labeled tree hierarchies having an associated numeral.

23. The apparatus of claim 17, the labeled tree hierarchies to comprise node-labeled tree hierarchies having an associated numeral.

24. The apparatus of claim 17,
wherein the accessed labeled tree hierarchy instructions further to employ a push operation with respect to the first labeled tree hierarchy in the second view before converting the first labeled tree to the first numeral, the push operation to comprise to attach a node to an edge of the first labeled tree hierarchy and label the node.

25. A method of forming a labeled tree, the method comprising:
accessing instructions from one or more physical memory devices for execution by one or more processors;
executing the instructions accessed from the one or more physical memory devices on the one or more processors;
storing, in at least one of the physical memory devices, a database, or a portion thereof containing the labeled tree in the form of signal values, and signal values resulting from having executed the instructions on the one or more processors;
wherein the accessed instructions to convert labeled trees; and
wherein executing the accessed labeled tree conversion instructions further comprising:
converting a first labeled tree in a first view to a first labeled tree in a second view; and
combining the first labeled tree in the second view with a second labeled tree in the second view,
wherein the combining forms a third labeled tree in the second view in which the third labeled tree comprises the first labeled tree in the second view and the second labeled tree in the second view,
wherein different views comprise different sets of distinct values from which labels for a labeled tree are selected.

26. The method of claim 25, wherein the labeled trees comprise labels having numerals.

27. The method of claim 25 wherein the labeled trees comprise labels having symbolic expressions.

28. The method of claim 25, wherein the labeled tree comprises labels having alphanumeric expressions.

29. The method of claim 25, wherein executing the accessed labeled tree conversion instructions further comprising comprises converting the third labeled tree in the second view to an associated numeral.

30. The method of claim 25,
wherein executing the accessed labeled tree conversion instructions to combine the first labeled tree in the second view with the second labeled tree in the second view further comprises employing expressions in which a merger operation has the form: X merged with Y=X*Y, wherein X and Y are labeled trees.

31. An article comprising:
a non-transitory storage medium comprising instructions stored thereon,
wherein the instructions being accessible from the non-transitory storage medium to store as physical memory states on one or more physical memory devices,
the one or more physical memory devices couple to one or more processors able to execute the instructions stored as physical memory states,
the one or more physical memory devices, a database, or a portion thereof to contain the labeled complex two-dimensional graphical hierarchy in the form of signal values, and also able to store binary digital signal quantities, if any, as physical memory states, that are to result from execution of the instructions on one or more processors,
wherein the executable instructions to convert a labeled tree; and
wherein the labeled tree conversion instructions further:
to convert a first labeled tree in a first view to a first labeled tree in a second view; and
to combine the first labeled tree in the second view with a second labeled tree in the second view,
wherein to combine forms a third labeled tree in the second view in which the third labeled tree to comprise the first labeled tree in the second view and the second labeled tree in the second view,
wherein different views to comprise different sets of distinct values from which labels for a labeled tree are to be selected.

32. The article of claim 31, wherein the labeled trees to comprise labels having numerals.

33. The article of claim 31 wherein the labeled trees to comprise labels having symbolic expressions.

34. The article of claim 31, wherein the labeled trees to comprise labels having alphanumeric expressions.

35. The article of claim 31, the instructions being further executable by the one or more processors to convert the third labeled tree in the second view to a numeral.

36. The article of claim 31,
wherein to combine the first labeled tree in the second view with the second labeled tree in the second view comprises instructions being further executable by the one or more processors to employ expressions in which the merger operation to have the form: X merged with Y=X*Y,
wherein X and Y to comprise labeled trees.

37. An apparatus to form a labeled tree (NLT), the apparatus comprising:
- one or more processors coupled to one or more physical memory devices to store executable instructions and to store binary digital signal quantities as physical memory states, wherein the executable instructions being:
- accessible from the physical memory devices for execution by one or more processors; and
- the one or more processors able to store in at least one of the physical memory devices, a database, or a portion thereof to contain the labeled tree in the form of signal values, binary digital signal quantities, if any, that are to result from execution of the instructions on the one or more processors,
- wherein the accessed executable instructions to convert a labeled tree; and
- wherein the accessed labeled tree conversion instructions further to:
- convert a first labeled tree in a first view to a first labeled tree in a second view; and
- combine the first labeled tree in the second view with a second labeled tree in the second view,
- wherein to combine is to form a third labeled tree in the second view in which the third labeled tree to comprise the first labeled tree in the second view and the second labeled tree in the second view wherein different views to comprise different sets of distinct values from which labels for a labeled tree are to be selected.

38. The apparatus of claim 37, wherein the labeled trees to comprise labels to have numerals.

39. The apparatus of claim 37, wherein the labeled trees to comprise labels to have symbolic expressions.

40. The apparatus of claim 37, wherein the labeled trees to comprise labels to have alphanumeric expressions.

41. The apparatus of claim 37, the apparatus further to convert the third labeled tree in the second view to a numeral.

42. The apparatus of claim 37,
- wherein to combine the first labeled tree in the second view with the second labeled tree in the second view further to comprise the accessed labeled tree conversion instructions to employ expressions in which the merger operation to have the form: X merged with Y=X*Y,
- wherein X and Y to comprise labeled trees.

* * * * *